United States Patent
Yamamoto et al.

(10) Patent No.: US 12,252,567 B2
(45) Date of Patent: Mar. 18, 2025

(54) ACRYLATE-BASED COPOLYMER, METHOD FOR PRODUCING SAID COPOLYMER, FRICTION REDUCER USING SAID COPOLYMER, AND LUBRICATING COMPOSITION CONTAINING SAID FRICTION REDUCER

(71) Applicant: ADEKA CORPORATION, Tokyo (JP)

(72) Inventors: Kenji Yamamoto, Tokyo (JP); Tsuyoshi Hiramatsu, Tokyo (JP); Shuhei Igarashi, Tokyo (JP); Kazuki Marumo, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 775 days.

(21) Appl. No.: 17/616,407

(22) PCT Filed: Jun. 2, 2020

(86) PCT No.: PCT/JP2020/021686
§ 371 (c)(1),
(2) Date: Dec. 3, 2021

(87) PCT Pub. No.: WO2020/246445
PCT Pub. Date: Dec. 10, 2020

(65) Prior Publication Data
US 2022/0251266 A1 Aug. 11, 2022

(30) Foreign Application Priority Data
Jun. 4, 2019 (JP) .................. 2019-104091

(51) Int. Cl.
*C08K 5/01* (2006.01)
*C08F 220/18* (2006.01)

(52) U.S. Cl.
CPC .......... *C08F 220/1812* (2020.02); *C08K 5/01* (2013.01)

(58) Field of Classification Search
CPC .................. C08F 220/1812; C08K 5/01
(Continued)

(56) References Cited

U.S. PATENT DOCUMENTS 5,373,041 A 12/1994 Prejean
2014/0016067 A1* 1/2014 Yoon .................. C08G 18/8029
349/96
(Continued)

FOREIGN PATENT DOCUMENTS

CN 103068956 4/2013
CN 103289615 9/2013
(Continued)

OTHER PUBLICATIONS

International Search Report issued Aug. 11, 2020 in International (PCT) Application No. PCT/JP2020/021686.
(Continued)

*Primary Examiner* — Kelechi C Egwim
(74) *Attorney, Agent, or Firm* — WENDEROTH, LIND & PONACK, L.L.P.

(57) ABSTRACT

The present invention provides an acrylate-based copolymer obtained by polymerizing constituent monomers including a polymerizable monomer (a) consisting of an alkyl acrylate-based monomer represented by the following general formula (1) in an amount of from 10 mol % to 95 mol % with respect to a total number of moles of the constituent monomers, a polymerizable monomer (b) consisting of an alkylene glycol acrylate-based monomer represented by the following general formula (2) in an amount of from 5 mol % to 50 mol % with respect to the total number of moles of the constituent monomers, and at least one kind of polymerizable monomer (c) selected from the group consisting of an aromatic vinyl-based monomer (c-1) and a short-chain alkyl acrylate-based monomer (c-2) represented by the following general formula (3) in an amount of from 0 mol % to 60 mol % with respect to the total number of moles of the constituent monomers. In the formula (1), $R^1$ represents an alkyl group having 4 to 18 carbon atoms, and $A^1$ represents a hydrogen atom. In the formula (2), $R^2$ represents an alkylene group having 2 to 4 carbon atoms, $R^3$ represents a hydrogen atom or an alkyl group having 1 to 30 carbon atoms, $A^2$ represents a hydrogen atom, and "n" represents a number from 2 to 20. In the formula (3), $R^4$ represents an alkyl group having 1 to 3 carbon atoms, and $A^3$ represents a hydrogen atom.

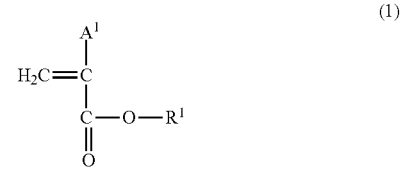

(1)

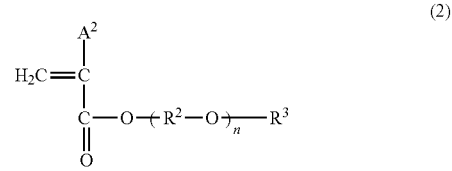

(2)

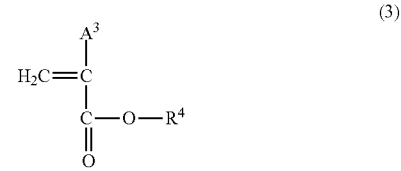

(3)

9 Claims, No Drawings

(58) Field of Classification Search
USPC .......................................................... 524/853
See application file for complete search history.

(56) References Cited

U.S. PATENT DOCUMENTS

2014/0016069 A1\*   1/2014  Kim ..................... C09J 133/04
                                                          349/96
2015/0299604 A1    10/2015  Takata et al.
2017/0355889 A1    12/2017  Kim et al.

FOREIGN PATENT DOCUMENTS

| EP | 2 792 733        | 10/2014 |           |
|----|------------------|---------|-----------|
| EP | 2792733 A1 \*    | 10/2014 | ............ C08F 220/18 |
| JP | 2-265999         | 10/1990 |           |
| JP | 7-53983          | 2/1995  |           |
| JP | 10-17586         | 1/1998  |           |
| JP | 2012-41407       | 3/2012  |           |
| JP | 2012-131963      | 7/2012  |           |
| JP | 2013-199631      | 10/2013 |           |
| JP | 2014-514387      | 6/2014  |           |
| JP | 2014-515046      | 6/2014  |           |
| JP | 2017-141439      | 8/2017  |           |
| JP | 2020-90653       | 6/2020  |           |
| KR | 10-2014-0110847  | 9/2014  |           |
| KR | 10-2014-0128887  | 11/2014 |           |

OTHER PUBLICATIONS

Extended European Search Report dated May 3, 2023, in corresponding European Application No. 20819237.7.

\* cited by examiner

ACRYLATE-BASED COPOLYMER, METHOD FOR PRODUCING SAID COPOLYMER, FRICTION REDUCER USING SAID COPOLYMER, AND LUBRICATING COMPOSITION CONTAINING SAID FRICTION REDUCER

TECHNICAL FIELD

The present invention relates to an acrylate-based copolymer that can be used as a friction reducer or the like exhibiting a satisfactory friction-reducing effect. Further, the present invention also relates to a method of producing the copolymer, a friction reducer consisting of the copolymer, and a lubricating oil composition containing the friction reducer.

BACKGROUND ART

A lubricating oil used in instruments and machines improves the friction and abrasion characteristics thereof by being added with friction reducers, such as an extreme-pressure agent, a friction modifier, and an abrasion-preventing agent, in order to suppress seizure or the like as much as possible to prolong the lifetimes of the instruments and machines. Of such friction reducers, an organic molybdenum compound is well known as a friction reducer having a high friction-reducing effect (Patent Literatures 1 and 2). However, the organic molybdenum compound does not always exhibit a friction-reducing effect under any use conditions. Only with the organic molybdenum compound, a sufficient friction-reducing effect may not be exhibited depending on the mode of use, and under severe conditions, such as point contact in which a large contact surface pressure is applied, the effect may be weakened to make it difficult to reduce friction.

In order to improve such situation, in Patent Literature 3, as an extreme-pressure agent for a lubricating oil excellent in dissolution stability and extreme-pressure performance, there is a description of an extreme-pressure agent for a lubricating oil consisting of a copolymer containing an alkyl acrylate and a hydroxyalkyl acrylate as essential constituent monomers. Further, in Patent Literature 4, there is a description that a lubricity improver for a fuel oil containing a copolymer containing a fatty acid, a monomer such as a (meth)acrylate, and a hydroxyl group-containing vinyl monomer as essential constituent monomers improves lubrication characteristics without clouding, solidification, or precipitation of crystals even in low temperature states, such as a winter season and a cold region. However, even with such extreme-pressure agent and lubricity improver, a sufficient friction-reducing effect still cannot be exhibited, and there has been a problem in improving the friction performance of a lubricating oil.

CITATION LIST

Patent Literature

[PTL 1] JP 07-53983 A
[PTL 2] JP 10-17586 A
[PTL 3] JP 2012-041407 A
[PTL 4] JP 2017-141439 A

SUMMARY OF INVENTION

Technical Problem

Accordingly, an object of the present invention is to provide an acrylate-based copolymer that can be used as a friction reducer or the like exhibiting a satisfactory friction-reducing effect.

Solution to Problem

In view of the foregoing, the inventors of the present invention made extensive investigations, and as a result, found out an acrylate-based copolymer that can be used as a friction reducer or the like exhibiting a satisfactory friction-reducing effect, to thereby complete the present invention. That is, the present invention relates to an acrylate-based copolymer obtained by polymerizing constituent monomers containing a polymerizable monomer (a) consisting of an alkyl acrylate-based monomer represented by the following general formula (1) in an amount of from 10 mol % to 95 mol % with respect to a total number of moles of the constituent monomers, a polymerizable monomer (b) consisting of an alkylene glycol acrylate-based monomer represented by the following general formula (2) in an amount of from 5 mol % to 50 mol % with respect to the total number of moles of the constituent monomers, and at least one kind of polymerizable monomer (c) selected from the group consisting of an aromatic vinyl-based monomer (c-1) and a short-chain alkyl acrylate-based monomer (c-2) represented by the following general formula (3) in an amount of from 0 mol % to 60 mol % with respect to the total number of moles of the constituent monomers:

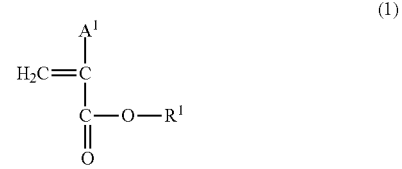

where $R^1$ represents an alkyl group having 4 to 18 carbon atoms, and $A^1$ represents a hydrogen atom;

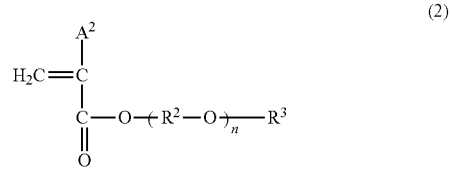

where $R^2$ represents an alkylene group having 2 to 4 carbon atoms, $R^3$ represents a hydrogen atom or an alkyl group having 1 to 30 carbon atoms, $A^2$ represents a hydrogen atom, and "n" represents a number from 2 to 20; and

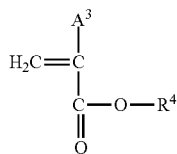

(3)

where $R^4$ represents an alkyl group having 1 to 3 carbon atoms, and $A^3$ represents a hydrogen atom.

Advantageous Effects of Invention

The acrylate-based copolymer according to the present invention can be used as the friction reducer or the like exhibiting a satisfactory friction-reducing effect.

DESCRIPTION OF EMBODIMENTS

A polymerizable monomer (a) for forming an acrylate-based copolymer of the present invention is an alkyl acrylate-based polymerizable monomer represented by the following general formula (1):

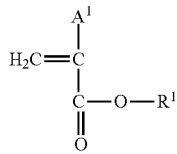

(1)

$R^1$ in the general formula (1) represents an alkyl group having 4 to 18 carbon atoms. Examples of such group include: linear alkyl groups, such as a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, and an octadecyl group; and branched alkyl groups, such as a branched butyl group, a branched pentyl group, a branched hexyl group, a branched heptyl group, a branched octyl group, a branched nonyl group, a branched decyl group, a branched undecyl group, a branched dodecyl group, a branched tridecyl group, a branched tetradecyl group, a branched pentadecyl group, a branched hexadecyl group, a branched heptadecyl group, and a branched octadecyl group. From the viewpoints of the friction characteristics of an acrylate-based copolymer to be obtained, $R^1$ is preferably an alkyl group having 6 to 18 carbon atoms, more preferably an alkyl group having 8 to 16 carbon atoms, still more preferably an alkyl group having 10 to 14 carbon atoms, particularly preferably a linear alkyl group having 10 to 14 carbon atoms, most preferably a linear alkyl group having 12 carbon atoms out of those groups.

$A^1$ in the general formula (1) represents a hydrogen atom. In the present invention, through use of a polymerizable monomer in which $A^1$ is a hydrogen atom (not a hydrocarbon group, such as a methyl group), an acrylate-based copolymer that can be used as a friction reducer or the like exhibiting a satisfactory friction-reducing effect can be obtained.

A polymerizable monomer (b) for forming the acrylate-based copolymer of the present invention is an alkylene glycol acrylate-based polymerizable monomer represented by the following general formula (2):

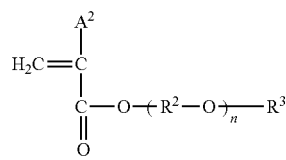

(2)

$R^2$ in the general formula (2) represents an alkylene group having 2 to 4 carbon atoms. Examples of such group include an ethylene group, a propylene group, a butylene group, a methylethylene group, a methylpropylene group, and a dimethylethylene group. Of those, from the viewpoints of the friction characteristics of an acrylate-based copolymer to be obtained, an alkylene group having 2 or 3 carbon atoms is preferred, and an ethylene group is more preferred.

$R^3$ in the general formula (2) represents a hydrogen atom or an alkyl group having 1 to 30 carbon atoms. Examples of the alkyl group having 1 to 30 carbon atoms include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an icosyl group, a heneicosyl group, a docosyl group, a tricosyl group, a tetracosyl group, a pentacosyl group, a hexacosyl group, a heptacosyl group, an octacosyl group, a nonacosyl group, and a triacontyl group. From the viewpoints of the friction characteristics of an acrylate-based copolymer to be obtained, $R^3$ is preferably a hydrogen atom or an alkyl group having 1 to 18 carbon atoms, more preferably a hydrogen atom or an alkyl group having 1 to 6 carbon atoms, still more preferably an alkyl group having 1 to 3 carbon atoms, most preferably a methyl group out of those groups.

$A^2$ in the general formula (2) represents a hydrogen atom. In the present invention, through use of a polymerizable monomer in which $A^2$ is a hydrogen atom (not a hydrocarbon group, such as a methyl group), an acrylate-based copolymer that can be used as a friction reducer or the like exhibiting a satisfactory friction-reducing effect can be obtained.

"n" in the general formula (2) represents a number from 2 to 20. From the viewpoints of the friction characteristics of an acrylate-based copolymer to be obtained, "n" is preferably from 6 to 20, more preferably from 8 to 18, still more preferably from 11 to 16, most preferably from 11 to 15. In this case, from the viewpoints of the friction characteristics of the acrylate-based copolymer to be obtained, an average value of "n" is preferably from 8 to 16, more preferably from 10 to 14, still more preferably from 12 to 14, most preferably 13.

A polymerizable monomer (c) for forming the acrylate-based copolymer of the present invention is at least one kind of polymerizable monomer selected from the group consisting of an aromatic vinyl-based monomer (c-1) and a short-chain alkyl acrylate-based monomer (c-2) represented by the following general formula (3):

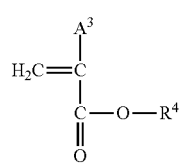

(3)

$R^4$ in the general formula (3) represents an alkyl group having 1 to 3 carbon atoms. Examples of such group include a methyl group, an ethyl group, and a propyl group. From the viewpoints of the friction characteristics of an acrylate-based copolymer to be obtained, $R^4$ is preferably a methyl group or an ethyl group, more preferably an ethyl group out of those groups.

$A^3$ in the general formula (3) represents a hydrogen atom. In the present invention, through use of a polymerizable monomer in which $A^3$ is a hydrogen atom (not a hydrocarbon group, such as a methyl group), an acrylate-based copolymer that can be used as a friction reducer or the like exhibiting a satisfactory friction-reducing effect can be obtained.

The aromatic vinyl-based monomer (c-1) that may be used in the present invention is not particularly limited as long as the monomer is a compound having a polymerizable vinyl group and an aromatic hydrocarbon group, and examples thereof include: a phenoxypolyethylene glycol acrylate, an ethoxylated o-phenylphenol acrylate, and an aromatic acrylate-based monomer represented by the following general formula (4); monocyclic vinyl monomers, such as styrene, vinyltoluene, 2,4-dimethylstyrene, and 4-ethylstyrene; and polycyclic vinyl monomers, such as 2-vinylnaphthalene, 1,5-divinylnaphthalene, and 4-vinylbiphenyl.

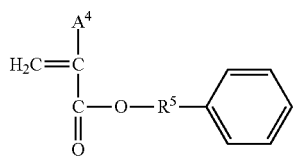

(4)

$R^5$ in the general formula (4) represents an alkylene group having 1 to 4 carbon atoms. Examples of such group include a methylene group, an ethylene group, a propylene group, a butylene group, a methylethylene group, a methylpropylene group, and a dimethylethylene group. From the viewpoints of the friction characteristics of an acrylate-based copolymer to be obtained, $R^5$ is preferably an alkylene group having 1 or 2 carbon atoms, more preferably a methylene group out of those groups.

$A^4$ in the general formula (4) represents a hydrogen atom. In the present invention, through use of a polymerizable monomer in which $A^4$ is a hydrogen atom (not a hydrocarbon group, such as a methyl group), an acrylate-based copolymer that can be used as a friction reducer or the like exhibiting a satisfactory friction-reducing effect can be obtained.

From the viewpoints of the friction characteristics of an acrylate-based copolymer to be obtained, the polymerizable monomer (c) contains, as the aromatic vinyl-based monomer (c-1), preferably at least one kind selected from a phenoxypolyethylene glycol acrylate, an ethoxylated o-phenylphenol acrylate, the aromatic acrylate-based monomer represented by the general formula (4), and an aromatic vinyl monomer having 8 to 14 carbon atoms, more preferably at least one kind of the aromatic acrylate-based monomer represented by the general formula (4) out of those monomers.

If the constituent monomers for forming the acrylate-based copolymer of the present invention contain the polymerizable monomer (c), the polymerizable monomer (c) may consist of the aromatic vinyl-based monomer (c-1) or the short-chain alkyl acrylate-based monomer (c-2), or may consist of the aromatic vinyl-based monomer (c-1) and the short-chain alkyl acrylate-based monomer (c-2). In addition, from the viewpoints of the friction characteristics of an acrylate-based copolymer to be obtained, the polymerizable monomer (c) consists of preferably the aromatic vinyl-based monomer (c-1) or the short-chain alkyl acrylate-based monomer (c-2), more preferably the aromatic vinyl-based monomer (c-1). From the viewpoints of the friction characteristics of the acrylate-based copolymer to be obtained, it is particularly preferred that the polymerizable monomer (c) contain, as the aromatic vinyl-based monomer (c-1), the aromatic acrylate-based monomer represented by the general formula (4). In addition, the polymerizable monomer (c) may consist of the aromatic acrylate-based monomer represented by the general formula (4).

In addition, if the constituent monomers contain, as the polymerizable monomer (c), the aromatic vinyl-based monomer (c-1) and the short-chain alkyl acrylate-based monomer (c-2), there is no particular limitation on a ratio between the composition ratio of the aromatic vinyl-based monomer (c-1) and the composition ratio of the short-chain alkyl acrylate-based monomer (c-2) in the constituent monomers for forming the acrylate-based copolymer, but the ratio (c-1):(c-2) is, for example, preferably from 10:90 to 90:10, more preferably from 40:60 to 80:20 by mole.

The constituent monomers for forming the acrylate-based copolymer of the present invention may contain the polymerizable monomer (a) in an amount of from 10 mol % to 95 mol % with respect to the total number of moles of the constituent monomers, the polymerizable monomer (b) in an amount of from 5 mol % to 50 mol % with respect to the total number of moles of the constituent monomers, and the polymerizable monomer (c) in an amount of from 0 mol % to 60 mol % with respect to the total number of moles of the constituent monomers. For example, in one embodiment, the above-mentioned constituent monomers may contain the polymerizable monomer (a) and the polymerizable monomer (b) without containing the polymerizable monomer (c), or may consist of the polymerizable monomer (a) and the polymerizable monomer (b). In another embodiment, the above-mentioned constituent monomers may contain the polymerizable monomer (a), the polymerizable monomer (b), and another polymerizable monomer (d) without containing the polymerizable monomer (c), or may consist of the polymerizable monomer (a), the polymerizable monomer (b), and the other polymerizable monomer (d). In still another embodiment, the above-mentioned constituent monomers may contain the polymerizable monomer (a), the polymerizable monomer (b), and the polymerizable monomer (c), or may consist of the polymerizable monomer (a), the polymerizable monomer (b), and the polymerizable monomer (c). In even still another embodiment, the above-mentioned constituent monomers may contain the polymerizable monomer (a), the polymerizable monomer (b), the polymerizable monomer (c), and another polymerizable monomer (d), or may consist of the polymerizable monomer (a), the polymerizable monomer (b), the polymerizable monomer (c), and the other polymerizable monomer (d).

There is no particular limitation on the other polymerizable monomer (d) that may be contained in the constituent monomers of the acrylate-based copolymer of the present invention as long as the other polymerizable monomer (d) is radically polymerizable. Examples thereof include: an acrylate-based compound except the polymerizable monomer (a), the polymerizable monomer (b), the aromatic acrylate-based monomer represented by the general formula (4), and the polymerizable monomer (c-2) in the present invention (e.g., an acrylate compound having an alkyl group having 19 or more carbon atoms, a nitrogen atom-containing alkyl acrylate compound, or a sulfur atom-containing alkyl acrylate compound); and a vinyl-based compound except the polymerizable monomer (c-1) (e.g., an alkyl vinyl ether compound, a methacrylate compound, an alkyl allyl ether compound, a nitrogen atom-containing vinyl compound, or a sulfur atom-containing vinyl compound). Of those, a hydroxyalkyl acrylate-based monomer represented by the following general formula (5) is preferably used as the other polymerizable monomer (d).

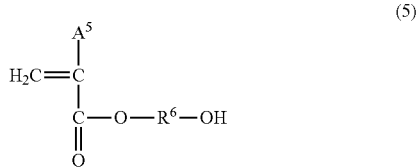

(5)

$R^6$ in the general formula (5) represents an alkylene group having 2 to 4 carbon atoms. Examples of such group include an ethylene group, a propylene group, a butylene group, a methylethylene group, a methylpropylene group, and a dimethylethylene group. Of those, from the viewpoints of the friction characteristics of an acrylate-based copolymer to be obtained, an alkylene group having 2 or 3 carbon atoms is preferred, and an ethylene group is more preferred.

$A^5$ in the general formula (5) represents a hydrogen atom. In the present invention, through use of a polymerizable monomer in which $A^5$ is a hydrogen atom (not a hydrocarbon group, such as a methyl group), an acrylate-based copolymer that can be used as a friction reducer or the like exhibiting a satisfactory friction-reducing effect can be obtained.

From the viewpoints of the friction characteristics and various characteristics, the constituent monomers for forming the acrylate-based copolymer of the present invention contain a polymerizable monomer having an acrylate group in an amount of generally from 90 mol % to 100 mol %, preferably from 95 mol % to 100 mol %, more preferably from 98 mol % to 100 mol %, still more preferably from 99 mol % to 100 mol % with respect to the total number of moles of the constituent monomers, and the above-mentioned constituent monomers most preferably consist only of the polymerizable monomer having an acrylate group. That is, it is most preferred that the acrylate-based copolymer of the present invention be obtained from a constituent monomer consisting of the polymerizable monomer having an acrylate group without containing a polymerizable monomer having a methacrylate group or the like.

A polymerizable monomer produced by a known production method may be used as any of the polymerizable monomers for forming the acrylate-based copolymer of the present invention, or a commercially available product may be used. As such production method, there is given, for example, a method involving esterifying an alcohol, an alkylene glycol, an aromatic alcohol, or the like having a hydrocarbon group corresponding to the structure of each monomer with acrylic acid.

In the constituent monomers for forming the acrylate-based copolymer of the present invention, the composition ratio of the above-mentioned polymerizable monomer (a) in the acrylate-based copolymer is from 10 mol % to 95 mol % with respect to the total number of moles of the constituent monomers, the composition ratio of the polymerizable monomer (b) is from 5 mol % to 50 mol % with respect to the total number of moles of the constituent monomers, and the composition ratio of the polymerizable monomer (c) is from 0 mol % to 60 mol % with respect to the total number of moles of the constituent monomers. Through adoption of such structure, the acrylate-based copolymer of the present invention can exhibit high friction characteristics in various base oils.

Under the condition that the constituent monomers for forming the acrylate-based copolymer of the present invention contain the polymerizable monomer (a), the polymerizable monomer (b), and the polymerizable monomer (c), or under the condition that the above-mentioned constituent monomers consist of the polymerizable monomer (a), the polymerizable monomer (b), and the polymerizable monomer (c), from the viewpoints of the friction characteristics of the acrylate-based copolymer, the composition ratio of the polymerizable monomer (a) in the above-mentioned constituent monomers is preferably from 15 mol % to 90 mol %, more preferably from 15 mol % to 85 mol % with respect to the total number of moles of the constituent monomers. In addition, from the viewpoints of the friction characteristics of the acrylate-based copolymer, the composition ratio of the polymerizable monomer (b) in the above-mentioned constituent monomers is preferably from 10 mol % to 45 mol %, more preferably from 10 mol % to 40 mol % with respect to the total number of moles of the constituent monomers under the above-mentioned conditions. In addition, from the viewpoints of the friction characteristics of the acrylate-based copolymer, the composition ratio of the polymerizable monomer (c) in the above-mentioned constituent monomers is preferably from 1 mol % to 50 mol %, more preferably from 5 mol % to 50 mol % with respect to the total number of moles of the constituent monomers under the above-mentioned conditions. In the present invention, if the polymerizable monomer (a) contains two or more kinds of polymerizable monomers, the composition ratio is calculated through use of the total molar quantity thereof as the molar amount of the polymerizable monomer (a). The same applies to the polymerizable monomer (b) and the polymerizable monomer (c).

Under the condition that the constituent monomers for forming the acrylate-based copolymer of the present invention contain the polymerizable monomer (a), the polymerizable monomer (b), and the polymerizable monomer (c), or under the condition that the above-mentioned constituent monomers consist of the polymerizable monomer (a), the polymerizable monomer (b), and the polymerizable monomer (c), from the viewpoints of the friction characteristics of the acrylate-based copolymer, a ratio (a):(b) between the composition ratio of the polymerizable monomer (a) and the composition ratio of the polymerizable monomer (b) in the constituent monomers for forming the acrylate-based copolymer is, for example, preferably from 20:80 to 90:10, more preferably from 30:70 to 90:10, still more preferably from 40:60 to 90:10, even more preferably from 40:60 to 70:30 by mole.

Under the condition that the constituent monomers for forming the acrylate-based copolymer of the present invention contain the polymerizable monomer (a), the polymerizable monomer (b), and the polymerizable monomer (c), or under the condition that the above-mentioned constituent monomers consist of the polymerizable monomer (a), the polymerizable monomer (b), and the polymerizable monomer (c), from the viewpoints of the friction characteristics of the acrylate-based copolymer, a ratio (b):(c) between the composition ratio of the polymerizable monomer (b) and the composition ratio of the polymerizable monomer (c) in the constituent monomers for forming the acrylate-based copolymer is, for example, preferably from 10:90 to 85:15, more preferably from 20:80 to 75:25, still more preferably from 25:75 to 75:25 by mole.

Under the condition that the constituent monomers for forming the acrylate-based copolymer of the present invention contain the polymerizable monomer (a), the polymerizable monomer (b), and the polymerizable monomer (c), or under the condition that the above-mentioned constituent monomers consist of the polymerizable monomer (a), the polymerizable monomer (b), and the polymerizable monomer (c), from the viewpoints of the friction characteristics of the acrylate-based copolymer, a ratio (a):(c) between the composition ratio of the polymerizable monomer (a) and the composition ratio of the polymerizable monomer (c) in the constituent monomers for forming the acrylate-based copolymer is, for example, preferably from 10:90 to 95:5, more preferably from 10:90 to 90:10, still more preferably from 15:85 to 75:25, even more preferably from 20:80 to 60:40 by mole.

Under the condition that the constituent monomers for forming the acrylate-based copolymer of the present invention contain the polymerizable monomer (a), the polymerizable monomer (b), and the polymerizable monomer (c), or under the condition that the above-mentioned constituent monomers consist of the polymerizable monomer (a), the polymerizable monomer (b), and the polymerizable monomer (c), from the viewpoints of the friction characteristics of the acrylate-based copolymer, the constituent monomers for forming the acrylate-based copolymer contain, as the polymerizable monomer (c), the aromatic vinyl-based monomer (c-1) in an amount of preferably from 5 mol % to 60 mol %, more preferably from 10 mol % to 60 mol %, still more preferably from 15 mol % to 50 mol % with respect to the total number of moles of the constituent monomers. When the constituent monomers for forming the acrylate-based copolymer of the present invention contain the aromatic vinyl-based monomer (c-1) as the polymerizable monomer (c), there is no particular limitation on a ratio between the composition ratio of the polymerizable monomer (b) and the composition ratio of the aromatic vinyl-based monomer (c-1) in the constituent monomers. However, from the viewpoints of the friction characteristics of the acrylate-based copolymer, the ratio (b):(c-1) is, for example, preferably from 10:90 to 90:10, more preferably from 20:80 to 80:20, still more preferably from 25:75 to 75:25 by mole.

Under the condition that the constituent monomers for forming the acrylate-based copolymer of the present invention contain the polymerizable monomer (a), the polymerizable monomer (b), and the polymerizable monomer (c), or under the condition that the above-mentioned constituent monomers consist of the polymerizable monomer (a), the polymerizable monomer (b), and the polymerizable monomer (c), from the viewpoints of the friction characteristics of the acrylate-based copolymer, in the constituent monomers for forming the acrylate-based copolymer, the composition ratio of the polymerizable monomer (b) in the constituent monomers is from 10 mol % to 40 mol % with respect to the total number of moles of the constituent monomers, the composition ratio of the polymerizable monomer (c-1) is from 5 mol % to 50 mol %, preferably from 20 mol % to 50 mol % with respect to the total number of moles of the constituent monomers, and a total of the composition ratio of the polymerizable monomer (b) and the composition ratio of the polymerizable monomer (c-1) is preferably from 15 mol % to 70 mol %, particularly preferably from 40 mol % to 70 mol % with respect to the total number of moles of the constituent monomers.

Under the condition that the constituent monomers for forming the acrylate-based copolymer of the present invention contain the polymerizable monomer (a), the polymerizable monomer (b), and the polymerizable monomer (c), or under the condition that the above-mentioned constituent monomers consist of the polymerizable monomer (a), the polymerizable monomer (b), and the polymerizable monomer (c), from the viewpoints of the friction characteristics of the acrylate-based copolymer of the present invention, the constituent monomers for forming the acrylate-based copolymer contain, as the polymerizable monomer (c), the aromatic acrylate-based monomer represented by the general formula (4) in an amount of preferably from 5 mol % to 60 mol %, more preferably from 10 mol % to 60 mol %, still more preferably from 25 mol % to 45 mol % with respect to the total number of moles of the polymerizable monomers for forming the acrylate-based copolymer. In this case, there is no particular limitation on a ratio between the composition ratio of the polymerizable monomer (b) and the composition ratio of the aromatic acrylate-based monomer represented by the general formula (4) in the constituent monomers. However, from the viewpoints of the friction characteristics of the acrylate-based copolymer, the ratio is preferably from 10:90 to 90:10, more preferably from 20:80 to 80:20, still more preferably from 25:75 to 75:25 by mole.

In addition, under the above-mentioned conditions, from the viewpoints of the friction characteristics of the acrylate-based copolymer of the present invention, as the polymerizable monomer (c), the aromatic acrylate-based monomer represented by the general formula (4) may be contained in an amount of from 1 mol % to 9 mol % with respect to the total number of moles of the polymerizable monomers for forming the acrylate-based copolymer. In this case, there is no particular limitation on the ratio between the composition ratio of the polymerizable monomer (b) and the composition ratio of the aromatic acrylate-based monomer represented by the general formula (4) in the constituent monomers. However, from the viewpoints of the friction characteristics of the acrylate-based copolymer, the ratio is preferably from 20:80 to 90:10, more preferably from 50:50 to 80:20, still more preferably from 60:40 to 75:25 by mole.

Under the condition that the constituent monomers for forming the acrylate-based copolymer of the present invention contain the polymerizable monomer (a), the polymerizable monomer (b), and the polymerizable monomer (c), or under the condition that the above-mentioned constituent monomers consist of the polymerizable monomer (a), the polymerizable monomer (b), and the polymerizable monomer (c), from the viewpoints of the friction characteristics of the acrylate-based copolymer of the present invention, in the constituent monomers for forming the acrylate-based copolymer, the composition ratio of the polymerizable monomer (b) in the constituent monomers is from 10 mol % to 40 mol % with respect to the total number of moles of the constituent monomers, the composition ratio of the aromatic acrylate-based monomer represented by the general formula (4) is from 5 mol % to 45 mol %, preferably from 25 mol % to 45 mol % with respect to the total number of moles of the constituent monomers, and a total of the composition ratio of the polymerizable monomer (b) and the composition ratio of the aromatic acrylate-based monomer represented by the general formula (4) is preferably from 15 mol % to 70 mol %, particularly preferably from 40 mol % to 70 mol % with respect to the total number of moles of the constituent monomers.

Under the condition that the constituent monomers for forming the acrylate-based copolymer of the present invention contain the polymerizable monomer (a), the polymerizable monomer (b), and the polymerizable monomer (c), or under the condition that the above-mentioned constituent monomers consist of the polymerizable monomer (a), the polymerizable monomer (b), and the polymerizable monomer (c), in the constituent monomers for forming the acrylate-based copolymer, the composition ratio of the aromatic acrylate-based monomer represented by the general formula (4) may be from 1 mol % to 9 mol % with respect to the total number of moles of the constituent monomers. In this case, from the viewpoints of the friction characteristics of the acrylate-based copolymer of the present invention, the composition ratio of the polymerizable monomer (a) in the above-mentioned constituent monomers is preferably from 65 mol % to 90 mol %, more preferably from 71 mol % to 90 mol % with respect to the total number of moles of the constituent monomers, and the composition ratio of the polymerizable monomer (b) in the constituent monomers is preferably from 5 mol % to 20 mol % with respect to the total number of moles of the constituent monomers. In addition, it is particularly preferred that the total of the composition ratio of the polymerizable monomer (b) and the composition ratio of the aromatic acrylate-based monomer represented by the general formula (4) be from 10 mol % to 29 mol % with respect to the total number of moles of the constituent monomers.

If the constituent monomers for forming the acrylate-based copolymer of the present invention contain the polymerizable monomer (a), the polymerizable monomer (b), and the polymerizable monomer (c), from the viewpoints of the friction characteristics of the acrylate-based copolymer of the present invention, in the constituent monomers for forming the acrylate-based copolymer, a total of the composition ratios of the polymerizable monomer (a), the polymerizable monomer (b), and the polymerizable monomer (c) in the constituent monomers is preferably from 60 mol % to 100 mol %, more preferably from 70 mol % to 100 mol %, still more preferably from 80 mol % to 100 mol %, particularly preferably from 90 mol % to 100 mol % with respect to the total number of moles of the constituent monomers.

In addition, if the constituent monomers for forming the acrylate-based copolymer of the present invention contain the polymerizable monomer (a), the polymerizable monomer (b), and the polymerizable monomer (c), and further, use a hydroxyalkyl acrylate-based monomer as the other polymerizable monomer (d), the composition ratio of the hydroxyalkyl acrylate-based monomer is, for example, preferably from 5 mol % to 40 mol %, more preferably from 10 mol % to 30 mol % with respect to the total number of moles of the constituent monomers for forming the acrylate-based copolymer. In this case, from the viewpoints of the friction characteristics, a total of the composition ratios of the polymerizable monomer (a), the polymerizable monomer (b), the polymerizable monomer (c), and the hydroxyalkyl acrylate-based monomer in the constituent monomers for forming the acrylate-based copolymer is preferably from 90 mol % to 100 mol %, more preferably from 95 mol % to 100 mol %, particularly preferably 100 mol % (that is, the constituent monomers for forming the acrylate-based copolymer of the present invention consist of the polymerizable monomer (a), the polymerizable monomer (b), the polymerizable monomer (c), and the polymerizable monomer (d)) with respect to the total number of moles of the constituent monomers for forming the acrylate-based copolymer. In the present invention, if the hydroxyalkyl acrylate-based monomer contains two or more kinds of hydroxyalkyl acrylate-based monomers, the composition ratio is calculated through use of the total molar quantity thereof as the molar amount of the hydroxyalkyl acrylate-based monomer.

Under the condition that the constituent monomers for forming the acrylate-based copolymer of the present invention contain the polymerizable monomer (a) and the polymerizable monomer (b), and does not contain the polymerizable monomer (c), or under the condition that the above-mentioned constituent monomers consist of the polymerizable monomer (a) and the polymerizable monomer (b), from the viewpoints of the friction characteristics of the acrylate-based copolymer, the composition ratio of the polymerizable monomer (a) in the above-mentioned constituent monomers is preferably from 30 mol % to 95 mol %, more preferably from 60 mol % to 92 mol %, still more preferably from 70 mol % to 90 mol %, even more preferably from 80 mol % to 90 mol % with respect to the total number of moles of the constituent monomers. Further, under the above-mentioned conditions, from the viewpoints of the friction characteristics of the acrylate-based copolymer, the composition ratio of the polymerizable monomer (b) in the above-mentioned constituent monomers is preferably from 5 mol % to 70 mol %, more preferably from 8 mol % to 40 mol %, still more preferably from 10 mol % to 30 mol %, even more preferably from 10 mol % to 20 mol % with respect to the total number of moles of the constituent monomers. In the present invention, when the polymerizable monomer (a) contains two or more kinds of polymerizable monomers, the composition ratio is calculated through use of the total molar quantity thereof as the molar amount of the polymerizable monomer (a). The same applies to the polymerizable monomer (b).

Under the condition that the constituent monomers for forming the acrylate-based copolymer of the present invention contain the polymerizable monomer (a) and the polymerizable monomer (b), and does not contain the polymerizable monomer (c), or under the condition that the above-mentioned constituent monomers consist of the polymerizable monomer (a) and the polymerizable monomer (b), from the viewpoints of the friction characteristics of the acrylate-based copolymer, a ratio (a):(b) between the composition ratio of the polymerizable monomer (a) and the composition ratio of the polymerizable monomer (b) in the constituent monomers for forming the acrylate-based copolymer is, for example, preferably from 30:70 to 95:5, more preferably from 30:70 to 93:7, still more preferably from 60:40 to 92:8, even more preferably from 80:20 to 90:10 by mole.

Under the condition that the constituent monomers for forming the acrylate-based copolymer of the present invention contain the polymerizable monomer (a) and the polymerizable monomer (b), and does not contain the polymerizable monomer (c), or under the condition that the above-mentioned constituent monomers consist of the polymerizable monomer (a) and the polymerizable monomer (b), from the viewpoints of the friction characteristics of the acrylate-based copolymer of the present invention, a total of the composition ratios of the polymerizable monomer (a) and the polymerizable monomer (b) in the constituent monomers for forming the acrylate-based copolymer is preferably from 60 mol % to 100 mol %, more preferably from 80 mol % to 100 mol %, still more preferably from 90 mol % to 100 mol %, particularly preferably 100 mol % (that is, the constituent monomers for forming the acrylate-based copolymer of the present invention consist of the polymerizable monomer (a) and the polymerizable monomer (b)) with respect to the total number of moles of the constituent monomers.

The mode of polymerization of the acrylate-based copolymer of the present invention is not particularly limited, and the acrylate-based copolymer may be any of a block copolymer, a random copolymer, and a block/random copolymer of each polymerizable monomer. In addition, the weight average molecular weight of the acrylate-based copolymer is not particularly limited, but is, for example, preferably from 1,000 to 500,000, more preferably from 2,000 to 300,000. When the weight average molecular weight falls within such ranges, the acrylate-based copolymer can exhibit high friction characteristics. The "weight average molecular weight" as described herein may be measured by gel permeation chromatography (GPC) and determined by styrene conversion.

From the viewpoints of safety and the influence on environment, it is preferred that the acrylate-based copolymer of the present invention be substantially free of metal elements and halogen atoms, and in addition, specifically, it is preferred that the acrylate-based copolymer substantially consist only of three elements of carbon, hydrogen, and oxygen.

A method of producing an acrylate-based copolymer of the present invention is not particularly specified, and the acrylate-based copolymer may be produced by any method as long as the method is a known method. For example, the acrylate-based copolymer of the present invention may be produced by subjecting polymerizable monomers to a polymerization reaction by a method, such as mass polymerization, emulsion polymerization, suspension polymerization, or solution polymerization. In addition, when the acrylate-based copolymer is used by being added to a base oil, such as a mineral oil or a synthetic oil, the mass polymerization or the solution polymerization is preferred as compared to a polymerization method involving using water as a solvent, such as the emulsion polymerization or the suspension polymerization, and the solution polymerization is more preferred.

A specific method for the solution polymerization may be as described below. For example, a solvent and a raw material containing polymerizable monomers are loaded into a reactor at one time or in fractional amounts, and then a temperature in the reactor is increased to from about 50° C. to about 120° C. An initiator is added in an amount of from 0.1 mol % to 10 mol % with respect to the total number of moles of the polymerizable monomers at one time or in fractional amounts, and the mixture is subjected to a reaction for from about 1 hour to about 20 hours while the mixture is stirred. Alternatively, the method may be as described below. The polymerizable monomers and a catalyst are loaded at one time, and then the temperature is increased to from about 50° C. to about 120° C. The mixture is subjected to a reaction for from about 1 hour to about 20 hours while the mixture is stirred.

Examples of the solvent that may be used include: alcohols, such as methanol, ethanol, propanol, and butanol; hydrocarbons, such as benzene, toluene, xylene, and hexane; esters, such as ethyl acetate, butyl acetate, and isobutyl acetate; ketones, such as acetone, methyl ethyl ketone, and methyl isobutyl ketone; ethers, such as methoxybutanol, ethoxybutanol, ethylene glycol monomethyl ether, ethylene glycol dimethyl ether, ethylene glycol monobutyl ether, propylene glycol monomethyl ether, propylene glycol dimethyl ether, propylene glycol monobutyl ether, dioxane, and tetrahydrofuran; mineral oils, such as a paraffin-based mineral oil, a naphthene-based mineral oil, and refined mineral oils obtained by refining these mineral oils through hydrotreating, solvent deasphalting, solvent extraction, solvent dewaxing, hydrogenation dewaxing, catalytic dewaxing, hydrocracking, alkaline distillation, sulfuric acid washing, clay treatment, or the like; and synthetic oils, such as a poly-α-olefin, an ethylene-α-olefin copolymer, polybutene, an alkylbenzene, an alkylnaphthalene, polyphenyl ether, an alkyl-substituted diphenyl ether, a polyol ester, a dibasic acid ester, a hindered ester, a monoester, and gas to liquids (GTL), and mixtures thereof.

Examples of the initiator that may be used include: azo-based initiators, such as 2,2'-azobis(2-methylpropionitrile), 2,2'-azobis(2-amidinopropane) dihydrochloride, 2,2'-azobis-(N,N-dimethyleneisobutylamidine) dihydrochloride, and 1,1'-azobis(cyclohexyl-1-carbonitrile); hydrogen peroxide and organic peroxides, such as benzoyl peroxide, t-butyl hydroperoxide, cumene hydroperoxide, methyl ethyl ketone peroxide, and perbenzoic acid; persulfuric acid salts, such as sodium persulfate, potassium persulfate, and ammonium persulfate; redox initiators, such as hydrogen peroxide-$Fe^{3+}$; and other existing radical initiators.

The mode of use of the acrylate-based copolymer of the present invention is not particularly limited, but the acrylate-based copolymer may be suitably used as, for example, a friction reducer in a situation in which a friction-reducing effect is required. The acrylate-based copolymer of the present invention is suitably used as, for example, a lubricating oil additive, a fuel oil additive, a hydraulic oil additive, a metalworking oil additive, or a grease additive. The acrylate-based copolymer is preferably used as a friction reducer for a lubricating oil out of those additives.

A lubricating oil composition of the present invention is a lubricating oil composition containing a friction reducer consisting of the above-mentioned acrylate-based copolymer and a base oil. The addition amount of the friction reducer in this case is not particularly limited, but for example, it is preferred that the above-mentioned friction reducer be contained in an amount of from 0.01 mass % to 50 mass % with respect to the total amount of the lubricating oil composition. The lubricating oil composition of the present invention exhibits extremely high friction-reducing performance by containing the above-mentioned friction inhibitor. From the viewpoints of friction characteristics, the lubricating oil composition of the present invention contains the above-mentioned friction inhibitor in an amount of more preferably from 0.02 mass % to 20 mass %, still more preferably from 0.05 mass % to 10 mass % with respect to the total amount of the lubricating oil composition.

The base oil that may be used in the present invention is not particularly limited, and is appropriately selected from, for example, a mineral base oil, a chemically synthesized base oil, animal and vegetable base oils, and a mixed base oil thereof depending on its intended use and use conditions. Here, examples of the mineral base oil include distillates each obtained by distilling, under normal pressure, a paraffin base crude oil, a naphthene base crude oil, or an intermediate base crude oil, or distilling, under reduced pressure, the residual oil of the distillation under normal pressure, and refined oils obtained by refining these distillates in accordance with an ordinary method, specifically a solvent-refined oil, a hydrogenated refined oil, a dewaxed oil, and a clay-treated oil.

Examples of the chemically synthesized base oil include a poly-α-olefin, polyisobutylene (polybutene), a monoester, a diester, a polyol ester, a silicic acid ester, a polyalkylene glycol, polyphenyl ether, a silicone, a fluorinated compound, an alkylbenzene, and a GTL base oil. Of those, a poly-α-olefin, polyisobutylene (polybutene), a diester, a polyol ester, and the like may be universally used. Examples of the poly-α-olefin include polymerized forms or oligomerized forms of 1-hexene, 1-octene, 1-nonene, 1-decene, 1-dodecene, and 1-tetradecene, or hydrogenated forms thereof. Examples of the diester include diesters of dibasic acids, such as glutaric acid, adipic acid, azelaic acid, sebacic acid, and dodecanedioic acid, and alcohols, such as 2-ethylhexanol, octanol, decanol, dodecanol, and tridecanol. Examples of the polyol ester include esters of polyols, such as neopentyl glycol, trimethylolethane, trimethylolpropane, pentaerythritol, dipentaerythritol, and tripentaerythritol, and fatty acids, such as caproic acid, caprylic acid, lauric acid, capric acid, myristic acid, palmitic acid, stearic acid, and oleic acid.

Examples of the animal and vegetable base oils include: vegetable oils and fats, such as castor oil, olive oil, cacao butter, sesame oil, rice bran oil, safflower oil, soybean oil, camellia oil, corn oil, rapeseed oil, palm oil, palm kernel oil, sunflower oil, cotton seed oil, and coconut oil; and animal oils and fats, such as beef tallow, lard, milk fat, fish oil, and whale oil. Those base oils may be used alone or in combination thereof. In addition, as required, highly refined base oils obtained by highly refining those base oils to reduce the amounts of impurities, such as sulfur, may be used.

Of those, a base oil containing a chemically synthesized base oil, such as a poly-α-olefin, polyisobutylene (polybutene), a diester, or a polyol ester, is preferred. A base oil containing a hydrocarbon oil, such as a poly-α-olefin, is more preferred. It is still more preferred to use highly refined base oils of those base oils.

From the viewpoints of friction characteristics, abrasion characteristics, oxidation stability, temperature stability, storage stability, cleanliness, a rust inhibiting property, a corrosion inhibiting property, handleability, and the like, known additives may be further added to the lubricating oil composition of the present invention in accordance with the purpose of use. For example, one kind or more kinds of known additives, such as an antioxidant, a friction-reducing agent, an abrasion-preventing agent, an oiliness improver, a cleaning agent, an ashless dispersant, a viscosity index improver, a rust inhibitor, a corrosion inhibitor, a metal deactivator, and an antifoaming agent, may be added, and those additives may be contained, for example, in a total amount of from 0.01 mass % to 50 mass % with respect to the total amount of the lubricating oil composition.

Examples of the antioxidant include: phenol-based antioxidants, such as 2,6-di-tertiary butylphenol ("tertiary butyl" is hereinafter abbreviated as "t-butyl"), 2,6-di-t-butyl-p-cresol, 2,6-di-t-butyl-4-methylphenol, 2,6-di-t-butyl-4-ethylphenol, 2,4-dimethyl-6-t-butylphenol, 4,4'-methylenebis(2,6-di-t-butylphenol), 4,4'-bis(2,6-di-t-butylphenol), 4,4'-bis(2-methyl-6-t-butylphenol), 2,2'-methylenebis(4-methyl-6-t-butylphenol), 2,2'-methylenebis(4-ethyl-6-t-butylphenol), 4,4'-butylidenebis(3-methyl-6-t-butylphenol), 4,4'-isopropylidenebis(2,6-di-t-butylphenol), 2,2'-methylenebis(4-methyl-6-cyclohexylphenol), 2,2'-methylenebis(4-methyl-6-nonylphenol), 2,2'-isobutylidenebis(4,6-dimethylphenol), 2,6-bis(2'-hydroxy-3'-t-butyl-5'-methylbenzyl)-4-methylphenol, 3-t-butyl-4-hydroxyanisole, 2-t-butyl-4-hydroxyanisole, octyl 3-(4-hydroxy-3,5-di-t-butylphenyl)propionate, stearyl 3-(4-hydroxy-3,5-di-t-butylphenyl)propionate, oleyl 3-(4-hydroxy-3,5-di-t-butylphenyl)propionate, dodecyl 3-(4-hydroxy-3,5-di-t-butylphenyl)propionate, decyl 3-(4-hydroxy-3,5-di-t-butylphenyl)propionate, tetrakis{3-(4-hydroxy-3,5-di-t-butylphenyl)propionyloxymethyl}methane, a 3-(4-hydroxy-3,5-di-t-butylphenyl)propionic acid glycerin monoester, an ester of 3-(4-hydroxy-3,5-di-t-butylphenyl)propionic acid and glycerin monooleyl ether, a 3-(4-hydroxy-3,5-di-t-butylphenyl)propionic acid butylene glycol diester, a 3-(4-hydroxy-3,5-di-t-butylphenyl)propionic acid thiodiglycol diester, 4,4'-thiobis(3-methyl-6-t-butylphenol), 4,4'-thiobis(2-methyl-6-t-butylphenol), 2,2'-thiobis(4-methyl-6-t-butylphenol), 2,6-di-t-butyl-α-dimethylamino-p-cresol, 2,6-di-t-butyl-4-(N,N'-dimethylaminomethylphenol), bis(3,5-di-t-butyl-4-hydroxybenzyl)sulfide, tris{(3,5-di-t-butyl-4-hydroxyphenyl)propionyl-oxyethyl}isocyanurate, tris(3,5-di-t-butyl-4-hydroxyphenyl)isocyanurate, 1,3,5-tris(3,5-di-t-butyl-4-hydroxybenzyl)isocyanurate, a bis{2-methyl-4-(3-n-alkylthiopropionyloxy)-5-t-butylphenyl}sulfide, 1,3,5-tris(4-t-butyl-3-hydroxy-2,6-dimethylbenzyl)isocyanurate, tetraphthaloyl-di(2,6-dimethyl-4-t-butyl-3-hydroxybenzyl sulfide), 6-(4-hydroxy-3,5-di-t-butylanilino)-2,4-bis(octylthio)-1,3,5-triazine, 2,2-thio-{diethyl-bis-3-(3,5-di-t-butyl-4-hydroxyphenyl)}propionate, N,N'-hexamethylenebis(3,5-di-t-butyl-4-hydroxy-hydrocinamide), a 3,5-di-t-butyl-4-hydroxy-benzyl-phosphoric acid diester, bis(3-methyl-4-hydroxy-5-t-butylbenzyl)sulfide, 3,9-bis[1,1-dimethyl-2-{β-(3-t-butyl-4-hydroxy-5-methylphenyl) propionyloxy}ethyl]-2,4,8,10-tetraoxaspiro[5,5]undecane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, and a bis{3,3'-bis-(4'-hydroxy-3'-t-butylphenyl)butyric acid}glycol ester; naphthylamine-based antioxidants, such as 1-naphthylamine, phenyl-1-naphthylamine, p-octylphenyl-1-naphthylamine, p-nonylphenyl-1-naphthylamine, p-dodecylphenyl-1-naphthylamine, and phenyl-2-naphthylamine; phenylenediamine-based antioxidants, such as N,N'-diisopropyl-p-phenylenediamine, N,N'-diisobutyl-p-phenylenediamine, N,N'-diphenyl-p-phenylenediamine, N,N'-di-Q-naphthyl-p-phenylenediamine, N-phenyl-N'-isopropyl-p-phenylenediamine, N-cyclohexyl-N'-phenyl-p-phenylenediamine, N-1,3-dimethylbutyl-N'-phenyl-p-phenylenediamine, dioctyl-p-phenylenediamine, phenylhexyl-p-phenylenediamine, and phenyloctyl-p-phenylenediamine; diphenylamine-based antioxidants, such as dipyridylamine, diphenylamine, p,p'-di-n-butyldiphenylamine, p,p'-di-t-butyldiphenylamine, p,p'-di-t-pentyldiphenylamine, p,p'-dioctyldiphenylamine, p,p'-dinonyldiphenylamine, p,p'-didecyldiphenylamine, p,p'-didodecyldiphenylamine, p,p'-distyryldiphenylamine, p,p'-dimethoxydiphenylamine, 4,4'-bis(4-α,α-dimethylbenzoyl)diphenylamine, p-isopropoxydiphenylamine, and dipyridylamine; phenothiazine-based antioxidants, such as phenothiazine, N-methylphenothiazine, N-ethylphenothiazine, 3,7-dioctylphenothiazine, a phenothiazine carboxylic acid ester, and phenoselenazine; and zinc dithiophosphate. The blending amount of such antioxidant is preferably from 0.01 mass % to 5 mass %, more preferably from 0.05 mass % to 4 mass % with respect to the total amount of the lubricating oil composition.

Examples of the friction-reducing agent include organic molybdenum compounds, such as molybdenum dithiocarbamate and molybdenum dithiophosphate. As molybdenum dithiocarbamate, there is given, for example, a compound represented by the following general formula (6):

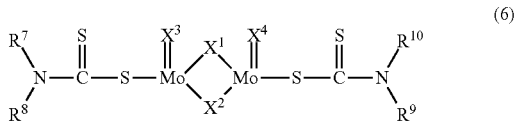

(6)

In the above-mentioned general formula (6), $R^7$ to $R^{10}$ each independently represent a hydrocarbon group having 1 to 20 carbon atoms, and examples of such group include: saturated aliphatic hydrocarbon groups, such as a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an icosyl group, and isomers of all those groups; unsaturated aliphatic hydrocarbon groups, such as an ethenyl group (vinyl group), a propenyl group (allyl group), a butenyl group, a pentenyl group, a hexenyl group, a heptenyl group, an octenyl group, a nonenyl group, a decenyl group, an undecenyl group, a dodecenyl group, a tridecenyl group, a tetradecenyl group, a pentadecenyl group, a hexadecenyl group, a heptadecenyl group, an octadecenyl group, a nonadecenyl group, and an icosenyl group, and isomers of all those groups; aromatic hydrocarbon groups, such as a phenyl group, a toluyl group, a xylyl group, a cumenyl group, a mesityl group, a benzyl group, a phenethyl group, a styryl group, a cinnamyl group, a benzhydryl group, a trityl group, an ethylphenyl group, a propylphenyl group, a butylphenyl group, a pentylphenyl group, a hexylphenyl group, a heptylphenyl group, an octylphenyl group, a nonylphenyl group, a decylphenyl group, an undecylphenyl group, a dodecylphenyl group, a styrenated phenyl group, a p-cumylphenyl group, a phenylphenyl group, a benzylphenyl group, an a-naphthyl group, and a p-naphthyl group, and isomers of all those groups; and cycloalkyl groups, such as a cyclopentyl group, a cyclohexyl group, a cycloheptyl group, a methylcyclopentyl group, a methylcyclohexyl group, a methylcycloheptyl group, a cyclopentenyl group, a cyclohexenyl group, a cycloheptenyl group, a methylcyclopentenyl group, a methylcyclohexenyl group, and a methylcycloheptenyl group, and isomers of all those groups. Of those, a saturated aliphatic hydrocarbon group and an unsaturated aliphatic hydrocarbon group are preferred, a saturated aliphatic hydrocarbon group is more preferred, and a saturated aliphatic hydrocarbon group having 3 to 15 carbon atoms is most preferred.

Further, in the general formula (6), $X^1$ to $X^4$ each independently represent a sulfur atom or an oxygen atom. It is preferred that $X^1$ and $X^2$ each represent a sulfur atom out of those atoms, and it is more preferred that $X^1$ and $X^2$ each represent a sulfur atom out of those atoms, and $X^3$ and $X^4$ each represent an oxygen atom out of those atoms.

The preferred blending amount of the friction-reducing agent is an amount in which the content of molybdenum in the lubricating oil composition is from 50 mass ppm to 3,000 mass ppm, more preferably from 100 mass ppm to 2,000 mass ppm, still more preferably from 200 mass ppm to 1,500 mass ppm.

Examples of the abrasion-preventing agent include: sulfur-based additives, such as a sulfurized oil and fat, an olefin polysulfide, an olefin sulfide, dibenzyl sulfide, ethyl-3-[[bis(1-methylethoxy)phosphinothioyl]thio]propionate, a tris-[(2 or 4)-isoalkylphenol] thiophosphate, 3-(di-isobutoxy-thiophosphorylsulfanyl)-2-methyl-propionic acid, triphenyl phosphorothionate, β-dithiophosphorylated propionic acid, methylenebis(dibutyl dithiocarbamate), O,O-diisopropyl-dithiophosphorylethyl propionate, 2,5-bis(n-nonyldithio)-1,3,4-thiadiazole, 2,5-bis(1,1,3,3-tetramethylbutanethio)-1,3,4-thiadiazole, and 2,5-bis(1,1,3,3-tetramethyldithio)-1,3,4-thiadiazole; phosphorus-based compounds, such as monooctyl phosphate, dioctyl phosphate, trioctyl phosphate, monobutyl phosphate, dibutyl phosphate, tributyl phosphate, monophenyl phosphate, diphenyl phosphate, triphenyl phosphate, tricresyl phosphate, monoisopropylphenyl phosphate, diisopropylphenyl phosphate, triisopropylphenyl phosphate, mono-tert-butylphenyl phosphate, di-tert-butylphenyl phosphate, tri-tert-butylphenyl phosphate, triphenyl thiophosphate, monooctyl phosphite, dioctyl phosphite, trioctyl phosphite, monobutyl phosphite, dibutyl phosphite, tributyl phosphite, monophenyl phosphite, diphenyl phosphite, triphenyl phosphite, monoisopropylphenyl phosphite, diisopropylphenyl phosphite, triisopropylphenyl phosphite, mono-tert-butylphenyl phosphite, di-tert-butylphenyl phosphite, and tri-tert-butylphenyl phosphite; organometallic compounds, such as a zinc dithiophosphate (ZnDTP) represented by the general formula (7), dithiophosphoric acid metal salts (Sb, Mo, and the like), dithiocarbamic acid metal salts (Zn, Sb, Mo, and the like), a naphthenic acid metal salt, a fatty acid metal salt, a phosphoric acid metal salt, a phosphoric acid ester metal salt, and a phosphorous acid ester metal salt; and a boron compound, alkylamine salts of mono- and dihexyl phosphates, a phosphoric acid ester amine salt, and a mixture of a triphenyl thiophosphoric acid ester and a tert-butylphenyl derivative.

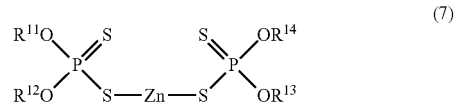

(7)

In the general formula (7), $R^{11}$ to $R^{14}$ each independently represent a hydrocarbon group having 1 to 20 carbon atoms, and examples of such group include: primary alkyl groups, such as a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an icosyl group; secondary alkyl groups, such as a secondary propyl group, a secondary butyl group, a secondary pentyl group, a secondary hexyl group, a secondary heptyl group, a secondary octyl group, a secondary nonyl group, a secondary decyl group, a secondary undecyl group, a secondary dodecyl group, a secondary tridecyl group, a secondary tetradecyl group, a secondary pentadecyl group, a secondary hexadecyl group, a secondary heptadecyl group, a secondary octadecyl group, a secondary nonadecyl group, and a secondary icosyl group; tertiary alkyl groups, such as a tertiary butyl group, a tertiary pentyl group, a tertiary hexyl group, a tertiary heptyl group, a tertiary octyl group, a tertiary nonyl group, a tertiary decyl group, a tertiary undecyl group, a tertiary dodecyl group, a tertiary tridecyl group, a tertiary tetradecyl group, a tertiary pentadecyl group, a tertiary hexadecyl group, a tertiary heptadecyl group, a tertiary octadecyl group, a tertiary nonadecyl group, and a tertiary icosyl group; branched alkyl groups, such as a branched butyl group (e.g., an isobutyl group), a branched pentyl group (e.g., an isopentyl group), a branched hexyl group (isohexyl group), a branched heptyl group (isoheptyl group), branched octyl groups (e.g., an isooctyl group and a 2-ethylhexyl group), a branched nonyl group (e.g., an isononyl group), a branched decyl group (e.g., an isodecyl group), a branched undecyl group (e.g., an isoundecyl group), a branched dodecyl group (e.g., an isododecyl group), a branched tridecyl group (e.g., an isotridecyl group), a branched tetradecyl group (isotetradecyl group), a branched pentadecyl group (e.g., an isopentadecyl group), a branched hexadecyl group (isohexadecyl group), a branched heptadecyl group (e.g., an isoheptadecyl group), a branched octadecyl group (e.g., an isooctadecyl group), a branched nonadecyl group (e.g., an isononadecyl group), and a branched icosyl group (e.g., an isoicosyl group); and aryl groups, such as a phenyl group, a toluyl group, a xylyl group, a cumenyl group, a mesityl group, a benzyl group, a phenethyl group, a styryl group, a cinnamyl group, a benzhydryl group, a trityl group, an ethylphenyl group, a propylphenyl group, a butylphenyl group, a pentylphenyl group, a hexylphenyl group, a heptylphenyl group, an octylphenyl group, a nonylphenyl group, a decylphenyl group, an undecylphenyl group, a dodecylphenyl group, a styrenated phenyl group, a p-cumylphenyl group, a phenylphenyl group, and a benzylphenyl group. The blending amount of such abrasion-preventing agent is preferably from 0.01 mass % to 3 mass %, more preferably from 0.05 mass % to 2 mass % with respect to the total amount of the lubricating oil composition.

Examples of the oiliness improver include: higher alcohols, such as oleyl alcohol and stearyl alcohol; fatty acids, such as oleic acid and stearic acid; esters, such as an oleyl glycerin ester, a stearyl glycerin ester, and a lauryl glycerin ester; amides, such as lauramide, oleamide, and stearamide; amines, such as laurylamine, oleylamine, and stearylamine; and ethers, such as lauryl glycerin ether and oleyl glycerin ether. The blending amount of such oiliness improver is preferably from 0.1 mass % to 5 mass %, more preferably from 0.2 mass % to 3 mass % with respect to the total amount of the lubricating oil composition.

Examples of the cleaning agent include sulfonates, phenates, salicylates, and phosphates of calcium, magnesium, and barium, and overbased salts thereof. Of those, a cleaning agent having a total base number (TBN) of from 30 mgKOH/g to 500 mgKOH/g is preferred. The blending amount of such cleaning agent is preferably from 0.5 mass % to 10 mass %, more preferably from 1 mass % to 8 mass % with respect to the total amount of the lubricating oil composition. In addition, the content of a calcium element derived from the cleaning agent in the lubricating oil composition is not particularly limited, but the content of the calcium element derived from the cleaning agent in the lubricating oil composition is preferably from 100 ppm to 3,000 ppm, more preferably from 200 ppm to 2,500 ppm from the viewpoints of cleanliness and the like. In addition, the content of a magnesium element derived from the cleaning agent in the lubricating oil composition is not particularly limited, but the content of the magnesium element derived from the cleaning agent in the lubricating oil composition is preferably from 50 ppm to 2,000 ppm, more preferably from 100 ppm to 1,000 ppm from the viewpoints of cleanliness and the like.

Any ashless dispersant to be used in a lubricant may be used as the ashless dispersant without any particular limitation. The ashless dispersant is, for example, a nitrogen-containing compound having at least one linear or branched alkyl group or alkenyl group having 40 to 400 carbon atoms in a molecule thereof, or a derivative thereof. Specific examples of the nitrogen-containing compound include succinimide, succinamide, a succinic acid ester, a succinic acid ester-amide, benzylamine, polyamine, polysuccinimide, and a Mannich base, and specific examples of the derivative thereof include products each obtained by subjecting any one of these nitrogen-containing compounds to a reaction with a boron compound, such as boric acid or a boric acid salt, a phosphorus compound, such as thiophosphoric acid or a thiophosphoric acid salt, an organic acid, or a hydroxy-polyoxyalkylene carbonate. When the number of carbon atoms of the alkyl group or the alkenyl group is less than 40, the solubility of the compound in a base oil may reduce. Meanwhile, when the number of carbon atoms of the alkyl group or the alkenyl group is more than 400, the low-temperature fluidity of the lubricating oil composition may deteriorate. The blending amount of such ashless dispersant is preferably from 0.5 mass % to 10 mass %, more preferably from 1 mass % to 8 mass % with respect to the total amount of the lubricating oil composition.

Examples of the viscosity index improver include a poly(C1-18)alkyl (meth)acrylate, a (C1-18)alkyl acrylate/(C1-18)alkyl (meth)acrylate copolymer, a diethylaminoethyl (meth)acrylate/(C1-18)alkyl (meth)acrylate copolymer, an ethylene/(C1-18)alkyl (meth)acrylate copolymer, polyisobutylene, polyalkylstyrene, an ethylene/propylene copolymer, a styrene/maleic acid ester copolymer, and a hydrogenated styrene/isoprene copolymer. Alternatively, a dispersion-type or multifunctional viscosity index improver to which dispersing performance has been imparted may be used. The weight average molecular weight of the viscosity index improver is from about 10,000 to about 1,500,000. The blending amount of such viscosity index improver is preferably from 0.1 mass % to 20 mass %, more preferably from 0.3 mass % to 15 mass % with respect to the total amount of the lubricating oil composition.

Examples of the rust inhibitor include sodium nitrite, an oxidized paraffin wax calcium salt, an oxidized paraffin wax magnesium salt, a tallow fatty acid alkali metal salt, an alkaline earth metal salt or an amine salt, an alkenylsuccinic acid or an alkenylsuccinic acid half ester (the molecular weight of the alkenyl group is from about 100 to about 300), a sorbitan monoester, nonylphenol ethoxylate, and a lanolin fatty acid calcium salt. The blending amount of such rust inhibitor is preferably from 0.01 mass % to 3 mass %, more preferably from 0.02 mass % to 2 mass % with respect to the total amount of the lubricating oil composition.

Examples of the corrosion inhibitor or the metal deactivator include: triazole, tolyltriazole, benzotriazole, benzimidazole, benzothiazole, benzothiadiazole, or derivatives of these compounds, such as 2-hydroxy-N-(1H-1,2,4-triazol-3-yl)benzamide, N,N-bis(2-ethylhexyl)-[(1,2,4-triazol-1-yl) methyl]amine, N,N-bis(2-ethylhexyl)-[(1,2,4-triazol-1-yl) methyl]amine, and 2,2'-[[(4 or 5 or 1)-(2-ethylhexyl)-methyl-1H-benzotriazole-1-methyl]imino]bisethanol; and bis(poly-2-carboxyethyl)phosphinic acid, hydroxyphosphonoacetic acid, a tetraalkylthiuram disulfide, N'1,N'12-bis(2-hydroxybenzoyl)dodecane dihydrazide, 3-(3,5-di-t-butylhydroxyphenyl)-N'-(3-(3,5-di-tert-butyl-hydroxyphenyl) propanoyl)propane hydrazide, an esterification product of tetrapropenylsuccinic acid and 1,2-propanediol, disodium sebacate, (4-nonylphenoxy)acetic acid, alkylamine salts of mono- and dihexyl phosphates, a sodium salt of tolyltriazole, and (Z)—N-methyl N-(1-oxo-9-octadecenyl)glycine. The blending amount of such corrosion inhibitor or metal deactivator is preferably from 0.01 mass % to 3 mass %, more preferably from 0.02 mass % to 2 mass % with respect to the total amount of the lubricating oil composition.

Examples of the antifoaming agent include polydimethylsilicone, dimethylsilicone oil, trifluoropropylmethylsilicone, colloidal silica, a polyalkyl acrylate, a polyalkyl methacrylate, an alcohol ethoxylate/propoxylate, a fatty acid ethoxylate/propoxylate, and a sorbitan partial fatty acid ester. The blending amount of such antifoaming agent is preferably from 0.001 mass % to 0.1 mass %, more preferably from 0.001 mass % to 0.01 mass % with respect to the total amount of the lubricating oil composition.

The lubricating oil composition of the present invention may be used in, for example, vehicular lubricating oils (such as gasoline engine oils, diesel engine oils, and drive system oils for automobiles or motorbikes) and industrial lubricating oils (such as gear oils, turbine oils, oil film bearing oils, refrigerant lubricating oils, vacuum pump oils, lubricating oils for compression, general-purpose lubricating oils, and grease). The lubricating oil composition of the present invention may be suitably used in vehicular lubricating oils out of those lubricating oils.

EXAMPLES

The present invention is hereinafter specifically described by way of the Examples, but the present invention is by no means limited by these Examples.

Polymerizable Monomer Used in the Examples
Polymerizable Monomer (a)
  (a-i): a polymerizable monomer represented by the general formula (1) in which $R^1$ is an alkyl group having 12 carbon atoms and $A^1$ is a hydrogen atom
Polymerizable Monomer (b)
  (b-i): a polymerizable monomer represented by the general formula (2) in which $R^2$ is an ethylene group, $R^3$ is a methyl group, $A^2$ is a hydrogen atom, and "n" is from 11 to 15 (average value is 13)
Polymerizable Monomer (c-1)
  (c-1-i): a polymerizable monomer represented by the general formula (4) in which $R^5$ is a methylene group and $A^4$ is a hydrogen atom
Polymerizable Monomer (c-2)
  (c-2-i): a polymerizable monomer represented by the general formula (3) in which $R^4$ is an ethyl group and $A^3$ is a hydrogen atom
Other Polymerizable Monomer (d)
  (d-i): a polymerizable monomer represented by the general formula (5) in which $R^6$ is an ethylene group and $A^5$ is a hydrogen atom
  (d-ii): lauryl methacrylate
  (d-iii): ethyl methacrylate

Example 1

108 Grams of 1,4-dioxane serving as a solvent and 108 g of a highly refined mineral oil (kinematic viscosity at 100° C.: 3.12 mm²/s, viscosity index: 112) were loaded into a reaction vessel, and a temperature in the vessel was increased to 85° C. As polymerizable monomers, 25.0 g of the polymerizable monomer (a-i), 62.8 g of the polymerizable monomer (b-i), 20.5 g of the polymerizable monomer (c-1-i), 0.19 g of 2,2-azobisisobutyronitrile, and 0.51 g of 1,1-azobiscyclohexane-1-carbonitrile were added dropwise to the resultant, and a polymerization reaction was performed by stirring the mixture for 4 hours. Thus, an acrylate-based copolymer was produced. After that, 1,4-dioxane was removed by reducing a pressure in the vessel (from 0.2 kPa to 1.0 kPa) while increasing the temperature to from 115° C. to 125° C. Thus, an acrylate-based copolymer solution was prepared. The composition ratio of each of the polymerizable monomers in the obtained acrylate-based copolymer is shown in Table 1.

<Evaluation of Friction Characteristics>

Friction characteristics were evaluated through use of the acrylate-based copolymer (acrylate-based copolymer 1) produced in Example 1 as a friction reducer. Specifically, an engine oil (kinematic viscosity at 100° C.: 7.2 mm²/s, viscosity index: 167) serving as a base oil 1 and the acrylate-based copolymer 1 were added so that the content of the acrylate-based copolymer became 0.25 mass % with respect to the total amount of a lubricating oil composition. Thus, a lubricating oil composition 1 was prepared. The obtained lubricating oil composition 1 was measured for a coefficient of friction under the following test conditions with a mini-traction machine (MTM) manufactured by PCS Instruments. The average value of coefficients of friction obtained during a period of 5 minutes before the end of the test was used as the coefficient of friction. The measurement result is shown in Table 1.

Test Conditions
  Load: 36 N
  Rolling speed: 50 mm/s
  Slide-roll ratio: 50%
  Test temperature: 100° C.
  Test time: 120 minutes

Examples 2 to 7 and Comparative Examples 1 to 4

As each of Examples 2 to 7 and Comparative Examples 1 to 3, an acrylate-based copolymer having composition ratios of polymerizable monomers in Table 1 was produced by the same method as that in Example 1 except that the kinds and usage amounts of the polymerizable monomers used herein were changed. Each of the acrylate-based copolymers (acrylate-based copolymers 2 to 10) produced in Examples 2 to 7 and Comparative Examples 1 to 3 was measured for a coefficient of friction by the same method as that in Example 1. The results are shown in Table 1. In addition, as Comparative Example 4, a lubricating oil composition consisting only of the base oil 1 without containing an acrylate-based copolymer was also measured for a coefficient of friction by the same method as that in Example 1. The result is shown in Table 1.

TABLE 1

| | | Example 1 | Example 2 | Example 3 | Example 4 | Example 5 | Example 6 | Example 7 | Comparative Example 1 | Comparative Example 2 | Comparative Example 3 | Comparative Example 4 |
|---|---|---|---|---|---|---|---|---|---|---|---|---|
| Composition ratio of polymerizable monomer (mol %) | (a-i) | 32.0% | 90.0% | 32.0% | 58.0% | 19.0% | 30.0% | 83.0% | 50.0% | 60.0% | | — |
| | (b-i) | 39.0% | 10.0% | 29.0% | 12.0% | 15.0% | 30.0% | 12.0% | | | 30.0% | |
| | (o-1-i) | 29.0% | | 39.0% | 30.0% | 44.0% | | 5.0% | 40.0% | | | |
| | (o-2-i) | | | | | | 40.0% | | | | | |
| | (d-i) | | | | | 22.0% | | | 10.0% | 40.0% | | |
| | (d-ii) | | | | | | | | | | 30.0% | |
| | (d-iii) | | | | | | | | | | 40.0% | |
| Coefficient of friction | | 0.10 | 0.07 | 0.06 | 0.09 | 0.11 | 0.09 | 0.08 | 0.12 | 0.13 | 0.12 | 0.13 |

It is understood from the above-mentioned results that the acrylate-based copolymer of the present invention exhibits a high friction-reducing effect when used as a friction reducer, and can be suitably used as a friction reducer for a lubricating oil, and the like.

Blending Examples 8 to 91

Blending examples of fuel oil compositions prepared through use of the acrylate-based copolymer of the present invention, and the following base oils, friction-reducing agents, abrasion-preventing agents, cleaning agents, and ashless dispersants are shown in Tables 2 to 8. The blending amount of molybdenum dithiocarbamate is represented by the amount in terms of a Mo element, the blending amount of zinc dithiophosphate is represented by the amount in terms of a P element, the blending amount of a calcium-based cleaning agent is represented by the amount in terms of a Ca element, and the blending amount of a magnesium-based cleaning agent is represented by the amount in terms of a Mg element.

Base oil 2: highly purified mineral oil (kinematic viscosity at 100° C.: 3.1 mm$^2$/s, viscosity index: 104)
Base oil 3: highly purified mineral oil (kinematic viscosity at 100° C.: 10.4 mm$^2$/s, viscosity index: 112)
Base oil 4: α-olefin-based synthetic oil (kinematic viscosity at 100° C.: 1.7 mm$^2$/s, viscosity index: 91)
Base oil 5: highly purified mineral oil (kinematic viscosity at 100° C.: 4.2 mm$^2$/s, viscosity index: 134)
Base oil 6: highly purified mineral oil (kinematic viscosity at 100° C.: 3.1 mm$^2$/s, viscosity index: 105)
Base oil 7: α-olefin-based synthetic oil (kinematic viscosity at 100° C.: 4.1 mm$^2$/s, viscosity index: 126)
Friction-reducing agent 1: a molybdenum dithiocarbamate represented by the general formula (6) in which $R^7$ and $R^8$ each represent an alkyl group having 8 carbon atoms, $R^9$ and $R^{10}$ each represent an alkyl group having 13 carbon atoms, $X^1$ and $X^2$ each represent a sulfur atom, and $X^3$ and $X^4$ each represent an oxygen atom
Friction-reducing agent 2: a molybdenum dithiocarbamate represented by the general formula (6) in which $R^7$ to $R^{10}$ each represent an alkyl group having 13 carbon atoms, $X^1$ and $X^2$ each represent a sulfur atom, and $X^3$ and $X^4$ each represent an oxygen atom
Abrasion-preventing agent 1: a zinc dithiophosphate represented by the general formula (7) in which $R^{11}$ to $R^{14}$ each represent an alkyl group having 4 carbon atoms
Abrasion-preventing agent 2: a zinc dithiophosphate represented by the general formula (7) in which $R^{11}$ to $R^{14}$ each represent an alkyl group having 8 carbon atoms
Abrasion-preventing agent 3: a zinc dithiophosphate represented by the general formula (7) in which $R^{11}$ to $R^{14}$ each represent an alkyl group having 4 or 6 carbon atoms
Cleaning agent 1: calcium salicylate having a TBN of 108 mgKOH/g
Cleaning agent 2: calcium salicylate having a TBN of 220 mgKOH/g
Cleaning agent 3: calcium salicylate having a TBN of 341 mgKOH/g
Cleaning agent 4: calcium sulfonate having a TBN of 201 mgKOH/g
Cleaning agent 5: magnesium salicylate having a TBN of 142 mgKOH/g
Cleaning agent 6: magnesium sulfonate having a TBN of 185 mgKOH/g
Cleaning agent 7: magnesium sulfonate having a TBN of 321 mgKOH/g
Ashless dispersant 1: a non-boronated alkenyl succinimide having a nitrogen content of 2.0 wt %
Ashless dispersant 2: a boronated alkenyl succinimide having a nitrogen content of 1.1 wt % and a boron atom content of 0.9 wt %
Ashless dispersant 3: a boronated alkenyl succinimide having a nitrogen content of 2.7 wt % and a boron atom content of 2.0 wt %

TABLE 2

| | | Blending Example 8 | Blending Example 9 | Blending Example 10 | Blending Example 11 | Blending Example 12 | Blending Example 13 | Blending Example 14 | Blending Example 15 | Blending Example 16 | Blending Example 17 | Blending Example 18 | Blending Example 19 |
|---|---|---|---|---|---|---|---|---|---|---|---|---|---|
| Base oil | Base oil 2 | Balance | Balance | Balance | Balance | Balance | Balance | Balance | Balance | Balance | Balance | Balance | Balance |
| | Base oil 3 | | | | | | | | | | | | |
| | Base oil 4 | | | | | | | | | | | | |
| Acrylate-based copolymer | Acrylate-based copolymer 3 | 0.10% | 0.10% | 0.25% | | 0.05% | 0.50% | 0.25% | 0.25% | 0.25% | 0.10% | 0.10% | 0.50% |
| | Acrylate-based copolymer 5 | | | | 0.25% | | | | | | | | |
| Friction-reducing agent | Friction-reducing agent 1 (Amount in terms of Mo) | 200 ppm | | 500 ppm | 500 ppm | 500 ppm | | 700 ppm | 700 ppm | 700 ppm | 700 ppm | 700 ppm | 700 ppm |
| | Friction-reducing agent 2 (Amount in terms of Mo) | | 200 ppm | | | | 500 ppm | | | | | | |
| Abrasion-preventing agent | Abrasion-preventing agent 1 (Amount in terms of P) | 200 ppm | 500 ppm | 300 ppm | | 700 ppm | 500 ppm | 200 ppm | | 500 ppm | 500 ppm | 200 ppm | |
| | Abrasion-preventing agent 2 (Amount in terms of P) | | | | 300 ppm | | | | 200 ppm | | | 300 ppm | 500 ppm |
| Cleaning agent | Cleaning agent 1 (Amount in terms of Ca) | 500 ppm | 300 ppm | | | 200 ppm | 800 ppm | 400 ppm | | 600 ppm | 200 ppm | | 300 ppm |
| | Cleaning agent 2 (Amount in terms of Ca) | | | 1,000 ppm | 600 ppm | 200 ppm | | | 1,500 ppm | 800 ppm | | | |
| | Cleaning agent 3 (Amount in terms of Ca) | | 100 ppm | | | 100 ppm | | | | | 200 ppm | 1,000 ppm | |
| | Cleaning agent 4 (Amount in terms of Ca) | 100 ppm | 200 ppm | | 200 ppm | 200 ppm | | 100 ppm | | 300 ppm | 500 ppm | | 1,000 ppm |
| | Cleaning agent 5 (Amount in terms of Mg) | | | | 100 ppm | 50 ppm | | | | | 200 ppm | 400 ppm | |
| | Cleaning agent 6 (Amount in terms of Mg) | | | | | | | | | | | | |
| Ashless dispersant | Ashless dispersant 1 | | 0.50% | 1.0% | | 0.50% | 0.50% | 1.0% | 1.0% | 0.50% | | 2.0% | |
| | Ashless dispersant 2 | 0.50% | | 1.0% | | | 3.0% | | | 0.50% | 2.0% | 2.0% | |
| | Ashless dispersant 3 | | 0.50% | | 3.0% | | | | 3.0% | 0.50% | | | 3.0% |
| | Total (%) | 100 | 100 | 100 | 100 | 100 | 100 | 100 | 100 | 100 | 100 | 100 | 100 |

TABLE 3

| | | Blending Example 20 | Blending Example 21 | Blending Example 22 | Blending Example 23 | Blending Example 24 | Blending Example 25 | Blending Example 26 | Blending Example 27 | Blending Example 28 | Blending Example 29 | Blending Example 30 | Blending Example 31 |
|---|---|---|---|---|---|---|---|---|---|---|---|---|---|
| Base oil | Base oil 2 | Balance | Balance | Balance | Balance | Balance | Balance | Balance | Balance | Balance | Balance | Balance | Balance |
| | Base oil 3 | | | | | | | | | | | | |
| | Base oil 4 | | | | | | | | | | | | |
| Acrylate-based copolymer | Acrylate-based copolymer 3 | 0.50% | 1.0% | | 0.25% | 0.25% | | 0.25% | | | 0.25% | 0.25% | 1.0% |
| | Acrylate-based copolymer 5 | | | 0.50% | | | 0.25% | | 0.25% | 0.50% | | | |
| Friction-reducing agent | Friction-reducing agent 1 (Amount in terms of Mo) | 700 ppm | 700 ppm | 700 ppm | | | | 1,000 ppm | 700 ppm | 1,000 ppm | | 1,200 ppm | 500 ppm |
| | Friction-reducing agent 2 (Amount in terms of Mo) | | | | 700 ppm | 700 ppm | 700 ppm | | 300 ppm | | 1,000 ppm | | 700 ppm |
| Abrasion-preventing agent | Abrasion-preventing agent 1 (Amount in terms of P) | 500 ppm | 500 ppm | 300 ppm | 500 ppm | 500 ppm | 700 ppm | 700 ppm | 700 ppm | 300 ppm | 300 ppm | 700 ppm | 500 ppm |
| | Abrasion-preventing agent 2 (Amount in terms of P) | | | | | | | | | | | | |
| Cleaning agent | Cleaning agent 1 (Amount in terms of Ca) | | 200 ppm | 100 ppm | | | | | | 300 ppm | 100 ppm | 300 ppm | |
| | Cleaning agent 2 (Amount in terms of Ca) | | 600 ppm | | 1,200 ppm | | | | | 800 ppm | | 1,000 ppm | |
| | Cleaning agent 3 (Amount in terms of Ca) | 2,000 ppm | | 1,000 ppm | | 1,500 ppm | | 2,500 ppm | 1,500 ppm | | 1,000 ppm | | 2,000 ppm |
| | Cleaning agent 4 (Amount in terms of Ca) | | | | 200 ppm | | 600 ppm | | 500 ppm | | 200 ppm | | |
| | Cleaning agent 5 (Amount in terms of Mg) | 1,000 ppm | | 400 ppm | 200 ppm | | | | 500 ppm | 200 ppm | | 400 ppm | 400 ppm |
| | Cleaning agent 6 (Amount in terms of Mg) | | 400 ppm | | 100 ppm | | | | 200 ppm | | | 100 ppm | |
| Ashless dispersant | Ashless dispersant 1 | 1.5% | 0.50% | 1.0% | 1.0% | 2.0% | 1.0% | 5.0% | 3.0% | 2.0% | 1.0% | 1.0% | 5.0% |
| | Ashless dispersant 2 | 0.5% | | | 2.0% | | 1.0% | | | 2.0% | | 3.0% | |
| | Ashless dispersant 3 | | | 1.0% | | 0.50% | | | | | 5.0% | | |
| | Total (%) | 100 | 100 | 100 | 100 | 100 | 100 | 100 | 100 | 100 | 100 | 100 | 100 |

TABLE 4

| | | Blending Example 32 | Blending Example 33 | Blending Example 34 | Blending Example 35 | Blending Example 36 | Blending Example 37 | Blending Example 38 | Blending Example 39 | Blending Example 40 | Blending Example 41 | Blending Example 42 | Blending Example 43 |
|---|---|---|---|---|---|---|---|---|---|---|---|---|---|
| Base oil | Base oil 2 | Balance | Balance | Balance | Balance | Balance | Balance | Balance | Balance | Balance | Balance | Balance | Balance |
| | Base oil 3 | | | | | | | | | | | | |
| | Base oil 4 | | | | | | | | | | | | |
| Acrylate-based copolymer | Acrylate-based copolymer 3 | 0.10% | 0.10% | 0.25% | 0.25% | 0.05% | 0.50% | 0.25% | 0.25% | 0.25% | 0.10% | 0.10% | 0.50% |
| | Acrylate-based copolymer 5 | | | | | | | | | | | | |
| Friction-reducing agent | Friction-reducing agent 1 (Amount in terms of Mo) | 200 ppm | | 500 ppm | 500 ppm | 500 ppm | | 700 ppm | 700 ppm | 700 ppm | 700 ppm | 700 ppm | 700 ppm |
| | Friction-reducing agent 2 (Amount in terms of Mo) | | 200 ppm | | | | 500 ppm | | | | | | |
| Abrasion-preventing agent | Abrasion-preventing agent 1 (Amount in terms of P) | 200 ppm | | 300 ppm | | 700 ppm | 500 ppm | 200 ppm | | 500 ppm | 500 ppm | 200 ppm | |
| | Abrasion-preventing agent 2 (Amount in terms of P) | | 500 ppm | | 300 ppm | | | | 200 ppm | | | 300 ppm | 500 ppm |
| Cleaning agent | Cleaning agent 1 | | 300 ppm | | | 200 ppm | 800 ppm | | | | 200 ppm | | 300 ppm |
| | Cleaning agent 2 | | | 600 ppm | 600 ppm | | | 400 ppm | | 600 ppm | | | |
| | Cleaning agent 3 (Amount in terms of Ca) | 500 ppm | | 1,000 ppm | | 200 ppm | | | 1,500 ppm | 800 ppm | | 1,000 ppm | 1,000 ppm |
| | Cleaning agent 4 (Amount in terms of Ca) | | 100 ppm | | | 100 ppm | | | | | 200 ppm | | |
| | Cleaning agent 5 (Amount in terms of Ca) | 100 ppm | 200 ppm | | 200 ppm | 200 ppm | | 100 ppm | | 300 ppm | 500 ppm | | |
| | Cleaning agent 6 (Amount in terms of Mg) | | | | 100 ppm | 50 ppm | | | | | 200 ppm | 400 ppm | |
| Ashless dispersant | Ashless dispersant 1 | 0.50% | 0.50% | 1.0% | | 0.50% | 0.50% | 1.0% | 1.0% | 0.50% | 2.0% | 2.0% | |
| | Ashless dispersant 2 | | 0.50% | 1.0% | | | 3.0% | | | 0.50% | | 2.0% | |
| | Ashless dispersant 3 | | | | 3.0% | | | | 3.0% | 0.50% | | | 3.0% |
| | Total (%) | 100 | 100 | 100 | 100 | 100 | 100 | 100 | 100 | 100 | 100 | 100 | 100 |

TABLE 5

| | Blending Example 44 | Blending Example 45 | Blending Example 46 | Blending Example 47 | Blending Example 48 | Blending Example 49 | Blending Example 50 | Blending Example 51 | Blending Example 52 | Blending Example 53 | Blending Example 54 | Blending Example 55 |
|---|---|---|---|---|---|---|---|---|---|---|---|---|
| Base oil | Base oil 2 | Balance | Balance | Balance | Balance | Balance | Balance | Balance | Balance | Balance | Balance | Balance | Balance |
| | Base oil 3 | | | | | | | | | | | | |
| | Base oil 4 | | | | | | | | | | | | |
| Acrylate-based copolymer | Acrylate-based copolymer 3 | 0.50% | 1.0% | 0.50% | 0.25% | 0.25% | 0.25% | 0.25% | 0.25% | 0.50% | 0.25% | 0.25% | 1.0% |
| | Acrylate-based copolymer 5 | | | | | | | | | | | | |
| Friction-reducing agent | Friction-reducing agent 1 (Amount in terms of Mo) | 700 ppm | 700 ppm | 700 ppm | | | | 1,000 ppm | 700 ppm | 1,000 ppm | | 1,200 ppm | 500 ppm |
| | Friction-reducing agent 2 (Amount in terms of Mo) | | | | 700 ppm | 700 ppm | 700 ppm | | 300 ppm | | 1,000 ppm | | 700 ppm |
| Abrasion-preventing agent | Abrasion-preventing agent 1 (Amount in terms of P) | 500 ppm | 500 ppm | 300 ppm | 500 ppm | 500 ppm | 700 ppm | 700 ppm | 700 ppm | 300 ppm | 300 ppm | 700 ppm | 500 ppm |
| | Abrasion-preventing agent 2 (Amount in terms of P) | | | | | | | | | | | | |
| Cleaning agent | Cleaning agent 1 (Amount in terms of Ca) | | 200 ppm | 100 ppm | | | | | | 300 ppm | 100 ppm | 300 ppm | |
| | Cleaning agent 2 (Amount in terms of Ca) | | 600 ppm | | 1,200 ppm | | | | | 800 ppm | | 1,000 ppm | |
| | Cleaning agent 3 (Amount in terms of Ca) | 2,000 ppm | | 1,000 ppm | 1,500 ppm | 1,500 ppm | | 2,500 ppm | 1,500 ppm | | 1,000 ppm | | 2,000 ppm |
| | Cleaning agent 4 (Amount in terms of Ca) | | | | 200 ppm | | 600 ppm | | 500 ppm | | 200 ppm | | |
| | Cleaning agent 5 (Amount in terms of Mg) | 1,000 ppm | | 400 ppm | 200 ppm | | | | 500 ppm | 200 ppm | | 400 ppm | 400 ppm |
| | Cleaning agent 6 (Amount in terms of Mg) | | 400 ppm | | 100 ppm | | | | 200 ppm | | | 100 ppm | |
| Ashless dispersant | Ashless dispersant 1 | 1.5% | 0.50% | 1.0% | 1.0% | 2.0% | 1.0% | 5.0% | 3.0% | 2.0% | 1.0% | 1.0% | 5.0% |
| | Ashless dispersant 2 | 0.5% | | | 2.0% | | 1.0% | | | 2.0% | | 3.0% | |
| | Ashless dispersant 3 | | | 1.0% | | 0.50% | | | | | 5.0% | | |
| | Total (%) | 100 | 100 | 100 | 100 | 100 | 100 | 100 | 100 | 100 | 100 | 100 | 100 |

TABLE 6

| | Blending Example 56 | Blending Example 57 | Blending Example 58 | Blending Example 59 | Blending Example 60 | Blending Example 61 | Blending Example 62 | Blending Example 63 | Blending Example 64 | Blending Example 65 | Blending Example 66 | Blending Example 67 |
|---|---|---|---|---|---|---|---|---|---|---|---|---|
| Base oil Base oil 2 | | | | | | | | | | | | |
| Base oil 3 | | | | | | | | | | | | |
| Base oil 4 | Balance | Balance | Balance | Balance | Balance | Balance | Balance | Balance | Balance | Balance | Balance | Balance |
| Acrylate-based copolymer 3 | 0.10% | 0.10% | 0.25% | 0.25% | 0.05% | 0.50% | 0.25% | 0.25% | 0.25% | 0.10% | 0.10% | 0.50% |
| Acrylate-based copolymer 5 | | | | | | | | | | | | |
| Friction-reducing agent 1 (Amount in terms of Mo) | 200 ppm | | 500 ppm | 500 ppm | 500 ppm | | 700 ppm | 700 ppm | 700 ppm | 700 ppm | 700 ppm | 700 ppm |
| Friction-reducing agent 2 (Amount in terms of Mo) | | 200 ppm | | | | 500 ppm | | | | | | |
| Abrasion-preventing agent 1 (Amount in terms of P) | 200 ppm | | 300 ppm | 300 ppm | 700 ppm | 500 ppm | 200 ppm | | 500 ppm | 500 ppm | 200 ppm | |
| Abrasion-preventing agent 2 (Amount in terms of P) | | 500 ppm | | | | | | 200 ppm | | | 300 ppm | 500 ppm |
| Cleaning agent 1 (Amount in terms of Ca) | | 300 ppm | | | 200 ppm | 800 ppm | | | | 200 ppm | | 300 ppm |
| Cleaning agent 2 (Amount in terms of Ca) | 500 ppm | | 1,000 ppm | 600 ppm | | | 400 ppm | | 600 ppm | | | |
| Cleaning agent 3 (Amount in terms of Ca) | | 100 ppm | | | 200 ppm | | | 1,500 ppm | 800 ppm | 200 ppm | 1,000 ppm | 1,000 ppm |
| Cleaning agent 4 (Amount in terms of Ca) | 100 ppm | 200 ppm | | 200 ppm | 200 ppm | | 100 ppm | | 300 ppm | 500 ppm | | |
| Cleaning agent 5 (Amount in terms of Mg) | | | | 100 ppm | 50 ppm | | | | | 200 ppm | 400 ppm | |
| Cleaning agent 6 (Amount in terms of Mg) | | | | | | | | | | | | |
| Ashless dispersant 1 | 0.50% | 0.50% | 1.0% | | 0.50% | 0.50% | 1.0% | 1.0% | 0.50% | | 2.0% | |
| Ashless dispersant 2 | | 0.50% | 1.0% | | | 3.0% | | | 0.50% | 2.0% | 2.0% | |
| Ashless dispersant 3 | | | | 3.0% | | | | 3.0% | 0.50% | | | 3.0% |
| Total (%) | 100 | 100 | 100 | 100 | 100 | 100 | 100 | 100 | 100 | 100 | 100 | 100 |

TABLE 7

| | | Blending Example 68 | Blending Example 69 | Blending Example 70 | Blending Example 71 | Blending Example 72 | Blending Example 73 | Blending Example 74 | Blending Example 75 | Blending Example 76 | Blending Example 77 | Blending Example 78 | Blending Example 79 |
|---|---|---|---|---|---|---|---|---|---|---|---|---|---|
| Base oil | Base oil 2 | Balance | Balance | Balance | Balance | Balance | Balance | Balance | Balance | Balance | Balance | Balance | Balance |
| | Base oil 3 | | | | | | | | | | | | |
| | Base oil 4 | | | | | | | | | | | | |
| Acrylate-based copolymer | Acrylate-based copolymer 3 | 0.50% | 1.0% | 0.50% | 0.25% | 0.25% | 0.25% | 0.25% | 0.25% | 0.50% | 0.25% | 0.25% | 1.0% |
| | Acrylate-based copolymer 5 | | | | | | | | | | | | |
| Friction-reducing agent | Friction-reducing agent 1 (Amount in terms of Mo) | 700 ppm | 700 ppm | 700 ppm | | | | 1,000 ppm | 700 ppm | 1,000 ppm | | 1,200 ppm | 500 ppm |
| | Friction-reducing agent 2 (Amount in terms of Mo) | | | | 700 ppm | 700 ppm | 700 ppm | | | | 1,000 ppm | | 700 ppm |
| Abrasion-preventing agent | Abrasion-preventing agent 1 (Amount in terms of P) | 500 ppm | 500 ppm | 300 ppm | 500 ppm | 500 ppm | 700 ppm | 700 ppm | 700 ppm | 300 ppm | 300 ppm | 700 ppm | 500 ppm |
| | Abrasion-preventing agent 2 (Amount in terms of P) | | | | | | | | | | | | |
| Cleaning agent | Cleaning agent 1 (Amount in terms of Ca) | | 200 ppm | 100 ppm | | | | | | 300 ppm | 100 ppm | 300 ppm | |
| | Cleaning agent 2 (Amount in terms of Ca) | | 600 ppm | | 1,200 ppm | | | | | 800 ppm | | 1,000 ppm | |
| | Cleaning agent 3 (Amount in terms of Ca) | 2,000 ppm | | 1,000 ppm | | 1,500 ppm | | 2,500 ppm | 1,500 ppm | | 1,000 ppm | | 2,000 ppm |
| | Cleaning agent 4 (Amount in terms of Ca) | 1,000 ppm | | | 200 ppm | | 600 ppm | | 500 ppm | | 200 ppm | | |
| | Cleaning agent 5 (Amount in terms of Mg) | | 400 ppm | 400 ppm | | | | | 500 ppm | 200 ppm | | 400 ppm | 400 ppm |
| | Cleaning agent 6 (Amount in terms of Mg) | | | | 100 ppm | | | | 200 ppm | | | 100 ppm | |
| Ashless dispersant | Ashless dispersant 1 | 1.5% | 0.50% | 1.0% | 1.0% | 2.0% | 1.0% | 5.0% | | 2.0% | 1.0% | 1.0% | 5.0% |
| | Ashless dispersant 2 | 0.5% | | | 2.0% | | 1.0% | | 3.0% | 2.0% | | 3.0% | |
| | Ashless dispersant 3 | | | 1.0% | | 0.50% | | | | | 5.0% | | |
| | Total (%) | 100 | 100 | 100 | 100 | 100 | 100 | 100 | 100 | 100 | 100 | 100 | 100 |

TABLE 8

|  |  | Blending Example 80 | Blending Example 81 | Blending Example 82 | Blending Example 83 | Blending Example 84 | Blending Example 85 | Blending Example 86 | Blending Example 87 | Blending Example 88 | Blending Example 89 | Blending Example 90 | Blending Example 91 |
|---|---|---|---|---|---|---|---|---|---|---|---|---|---|
| Base oil | Base oil 5 | Balance | Balance | Balance | Balance | Balance | Balance | Balance | Balance | Balance | Balance | Balance | Balance |
|  | Base oil 6 |  |  |  |  | 10.0% | 40.0% | 10.0% | 40.0% |  |  |  |  |
|  | Base oil 7 |  |  |  |  |  |  |  |  |  |  |  |  |
| Acrylate-based copolymer | Acrylate-based copolymer 3 | 0.50% | 1.0% | 0.50% | 0.25% | 0.25% | 0.25% | 0.25% | 0.25% | 0.50% | 0.25% | 0.25% | 1.0% |
|  | Acrylate-based copolymer 7 |  |  |  |  |  |  |  |  |  |  |  |  |
| Friction-reducing agent | Friction-reducing agent 1 (Amount in terms of Mo) | 700 ppm | 700 ppm | 700 ppm |  |  |  | 1,000 ppm | 700 ppm | 1,000 ppm |  | 1,200 ppm | 500 ppm |
|  | Friction-reducing agent 2 (Amount in terms of Mo) |  |  |  | 700 ppm | 700 ppm | 700 ppm |  | 300 ppm |  | 1,000 ppm |  | 700 ppm |
| Abrasion-preventing agent | Abrasion-preventing agent 3 (Amount in terms of P) |  |  | 300 ppm | 500 ppm |  | 700 ppm | 700 ppm |  | 300 ppm |  | 700 ppm |  |
| Cleaning agent | Cleaning agent 1 (Amount in terms of Ca) |  | 200 ppm | 100 ppm |  |  |  |  |  | 300 ppm | 100 ppm | 300 ppm |  |
|  | Cleaning agent 2 (Amount in terms of Ca) |  | 600 ppm |  | 1,200 ppm |  |  |  |  | 800 ppm |  | 1,000 ppm |  |
|  | Cleaning agent 3 (Amount in terms of Ca) | 2,000 ppm |  | 1,000 ppm |  | 1,500 ppm |  |  | 1,500 ppm |  | 1,000 ppm |  | 2,000 ppm |
|  | Cleaning agent 4 (Amount in terms of Ca) |  |  |  | 200 ppm |  |  | 2,000 ppm | 500 ppm |  | 200 ppm |  |  |
|  | Cleaning agent 5 (Amount in terms of Mg) | 1,000 ppm |  |  | 200 ppm |  | 600 ppm |  | 500 ppm |  |  | 400 ppm | 400 ppm |
|  | Cleaning agent 6 (Amount in terms of Mg) |  | 400 ppm |  |  | 200 ppm |  |  |  | 200 ppm |  | 100 ppm |  |
|  | Cleaning agent 7 (Amount in terms of Mg) |  |  | 900 ppm | 100 ppm |  |  |  | 200 ppm |  |  |  |  |
| Ashless dispersant | Ashless dispersant 1 | 4.0% | 0.50% | 2.0% | 1.0% | 3.0% | 2.0% | 5.0% |  | 2.0% | 1.0% | 1.0% | 4.0% |
|  | Ashless dispersant 2 | 1.0% |  | 2.0% |  |  | 2.0% |  | 4.0% | 2.0% |  | 3.0% |  |
|  | Ashless dispersant 3 |  |  |  |  | 1.0% |  |  |  |  | 4.0% |  |  |
| Total (%) |  | 100 | 100 | 100 | 100 | 100 | 100 | 100 | 100 | 100 | 100 | 100 | 100 |

The invention claimed is:

1. A lubricating oil composition, comprising:
a friction reducer consisting of an acrylate-based copolymer; and
a base oil wherein the acrylate-based copolymer is obtained by polymerizing monomers containing a polymerizable monomer (a) consisting of an alkyl acrylate-based monomer represented by the following general formula (1) in an amount of from 10 mol % to 95 mol % with respect to a total number of moles of the constituent monomers, a polymerizable monomer (b) consisting of an alkylene glycol acrylate-based monomer represented by the following general formula (2) in an amount of from 5 mol % to 50 mol % with respect to the total number of moles of the constituent monomers, and at least one kind of polymerizable monomer (c) selected from the group consisting of an aromatic vinyl-based monomer (c-1) and a short-chain alkyl acrylate-based monomer (c-2) represented by the following general formula (3) in an amount of from 0 mol % to 60 mol % with respect to the total number of moles of the constituent monomers:

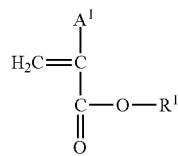
(1)

wherein $R^1$ represents an alkyl group having 4 to 18 carbon atoms, and $A^1$ represents a hydrogen atom;

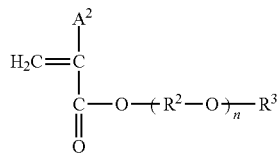
(2)

wherein $R^2$ represents an alkylene group having 2 to 4 carbon atoms, $R^3$ represents a hydrogen atom or an alkyl group having 1 to 30 carbon atoms, $A^2$ represents a hydrogen atom, and "n" represents a number from 2 to 20; and

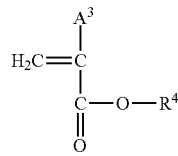
(3)

wherein $R^4$ represents an alkyl group having 1 to 3 carbon atoms, and $A^3$ represents a hydrogen atom.

2. A method of inhibiting friction of a base oil, comprising adding an acrylate-based copolymer to the base oil wherein the acrylate-based copolymer is obtained by polymerizing monomers containing a polymerizable monomer (a) consisting of an alkyl acrylate-based monomer represented by the following general formula (1) in an amount of from 10 mol % to 95 mol % with respect to a total number of moles of the constituent monomers, a polymerizable monomer (b) consisting of an alkylene glycol acrylate-based monomer represented by the following general formula (2) in an amount of from 5 mol % to 50 mol % with respect to the total number of moles of the constituent monomers, and at least one kind of polymerizable monomer (c) selected from the group consisting of an aromatic vinyl-based monomer (c-1) and a short-chain alkyl acrylate-based monomer (c-2) represented by the following general formula (3) in an amount of from 0 mol % to 60 mol % with respect to the total number of moles of the constituent monomers:

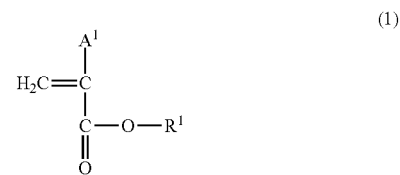
(1)

wherein $R^1$ represents an alkyl group having 4 to 18 carbon atoms, and $A^1$ represents a hydrogen atom;

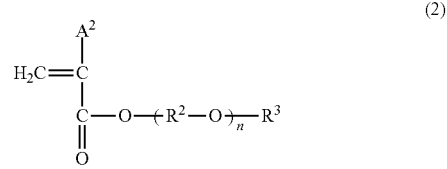
(2)

wherein $R^2$ represents an alkylene group having 2 to 4 carbon atoms, $R^3$ represents a hydrogen atom or an alkyl group having 1 to 30 carbon atoms, $A^2$ represents a hydrogen atom, and "n" represents a number from 2 to 20; and

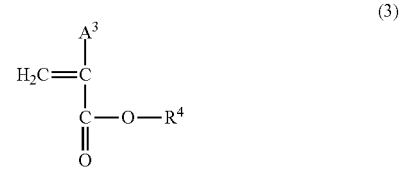
(3)

wherein $R^4$ represents an alkyl group having 1 to 3 carbon atoms, and $A^3$ represents a hydrogen atom.

3. A lubricating oil composition, comprising:
a friction reducer consisting of an acrylate-based copolymer; and
a base oil wherein the acrylate-based copolymer is obtained by polymerizing constituent monomers containing a polymerizable monomer (a) consisting of an alkyl acrylate-based monomer represented by the following general formula (1) in an amount of from 30 mol % to 95 mol % with respect to a total number of moles of the constituent monomers, and a polymerizable monomer (b) consisting of an alkylene glycol acrylate-based monomer represented by the following general formula (2) in an amount of from 5 mol % to 70 mol % with respect to the total number of moles of the constituent monomers:

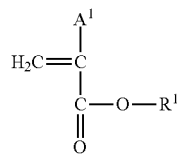

(1)

wherein R¹ represents an alkyl group having 4 to 18 carbon atoms, and A¹ represents a hydrogen atom; and

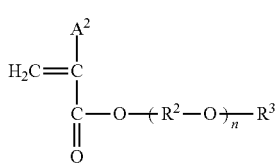

(2)

wherein $R^2$ represents an alkylene group having 2 to 4 carbon atoms, $R^3$ represents a hydrogen atom or an alkyl group having 1 to 30 carbon atoms, $A^2$ represents a hydrogen atom, and "n" represents a number from 2 to 20.

4. A method of inhibiting friction of a base oil, comprising adding an acrylate-based copolymer to the base oil wherein the acrylate-based copolymer is obtained by polymerizing constituent monomers containing a polymerizable monomer (a) consisting of an alkyl acrylate-based monomer represented by the following general formula (1) in an amount of from 30 mol % to 95 mol % with respect to a total number of moles of the constituent monomers, and a polymerizable monomer (b) consisting of an alkylene glycol acrylate-based monomer represented by the following general formula (2) in an amount of from 5 mol % to 70 mol % with respect to the total number of moles of the constituent monomers:

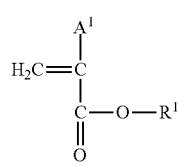

(1)

wherein R¹ represents an alkyl group having 4 to 18 carbon atoms, and A¹ represents a hydrogen atom; and

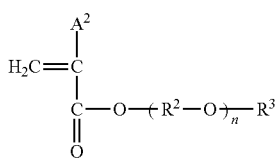

(2)

wherein $R^2$ represents an alkylene group having 2 to 4 carbon atoms, $R^3$ represents a hydrogen atom or an alkyl group having 1 to 30 carbon atoms, $A^2$ represents a hydrogen atom, and "n" represents a number from 2 to 20.

5. The lubricating oil composition according to claim 1, wherein the polymerizable monomer (c) of the acrylate-based copolymer contains, as the aromatic vinyl-based monomer (c-1), an aromatic acrylate-based monomer represented by the following general formula (4):

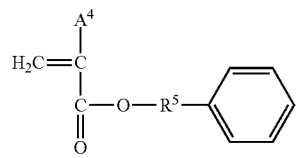

(4)

wherein $R^5$ represents an alkylene group having 1 to 4 carbon atoms, and $A^4$ represents a hydrogen atom.

6. The lubricating oil composition according to claim 1, wherein the polymerizable monomer (b) of the acrylate-based copolymer contains an alkylene glycol acrylate-based monomer represented by the general formula (2) in which $R^3$ represents a hydrogen atom or an alkyl group having 1 to 6 carbon atoms and "n" represents a number from 6 to 20.

7. The lubricating oil composition according to claim 1, wherein a composition ratio of the aromatic vinyl-based monomer (c-1) is from 5 mol % to 60 mol % with respect to the total number of moles of the constituent monomers of the acrylate-based copolymer.

8. The lubricating oil composition according to claim 1, wherein a ratio between a composition ratio of the alkylene glycol acrylate-based monomer (b) and a composition ratio of the aromatic vinyl-based monomer (c-1) in the constituent monomers of the acrylate-based copolymer is from 10:90 to 100:0 by mole.

9. The lubricating oil composition according to claim 1, wherein the constituent monomers of the acrylate-based copolymer further contain a hydroxyalkyl acrylate-based monomer represented by the following general formula (5) in an amount of from 5 mol % to 40 mol % with respect to the total number of moles of the constituent monomers:

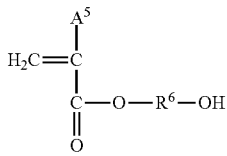

(5)

wherein $R^6$ represents an alkylene group having 2 to 4 carbon atoms, and $A^5$ represents a hydrogen atom.

* * * * *